United States Patent
Marshall et al.

(10) Patent No.: US 12,418,053 B2
(45) Date of Patent: Sep. 16, 2025

(54) BATTERY SYSTEM WITH PARALLEL JOINING PROTECTION

(71) Applicant: BRIGGS & STRATTON, LLC, Wauwatosa, WI (US)

(72) Inventors: Michael Marshall, Wauwatosa, WI (US); Jacob Schmalz, Milwaukee, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 787 days.

(21) Appl. No.: 17/638,287

(22) PCT Filed: Aug. 27, 2020

(86) PCT No.: PCT/US2020/048211
§ 371 (c)(1),
(2) Date: Feb. 25, 2022

(87) PCT Pub. No.: WO2021/041684
PCT Pub. Date: Mar. 4, 2021

(65) Prior Publication Data
US 2022/0407122 A1 Dec. 22, 2022

Related U.S. Application Data

(60) Provisional application No. 62/892,803, filed on Aug. 28, 2019.

(51) Int. Cl.
| | | |
|---|---|---|
| H01M 10/42 | (2006.01) | |
| H01M 10/48 | (2006.01) | |
| H01M 50/296 | (2021.01) | |
| H01M 50/505 | (2021.01) | |
| H02J 7/00 | (2006.01) | |
| H02J 7/34 | (2006.01) | |

(52) U.S. Cl.
CPC ..... *H01M 10/4257* (2013.01); *H01M 10/482* (2013.01); *H01M 50/296* (2021.01); *H01M 50/505* (2021.01); *H02J 7/00036* (2020.01); *H02J 7/0048* (2020.01); *H02J 7/007182* (2020.01); *H02J 7/345* (2013.01); *H01M 2010/4271* (2013.01)

(58) Field of Classification Search
CPC ........... H01M 10/4257; H01M 10/482; H01M 50/296; H01M 50/505; H01M 2010/4271; H01M 10/425; H01M 50/204; H02J 7/00036; H02J 7/0048; H02J 7/007182; H02J 7/345; H02J 2207/40; H02J 7/0031; H02J 7/0016; H02J 7/0047; Y02E 60/10
See application file for complete search history.

(56) References Cited

U.S. PATENT DOCUMENTS

| | | | |
|---|---|---|---|
| 2011/0032038 A1 | 2/2011 | Shimamoto et al. | |
| 2012/0182021 A1* | 7/2012 | McCoy .............. | G01R 31/3832 324/433 |
| 2012/0274279 A1* | 11/2012 | Banos ................... | H02J 7/0036 320/112 |
| 2012/0330488 A1 | 12/2012 | Sadler | |
| 2013/0062946 A1 | 3/2013 | Ferber, Jr. | |
| 2015/0200552 A1* | 7/2015 | Nortman .............. | H02J 7/0016 320/134 |
| 2015/0273995 A1 | 10/2015 | Muto et al. | |
| 2016/0141894 A1* | 5/2016 | Beaston ................ | H02J 7/0014 320/103 |
| 2019/0075724 A1 | 3/2019 | Becke et al. | |
| 2019/0245369 A1* | 8/2019 | Banos ................. | H02J 7/00308 |

FOREIGN PATENT DOCUMENTS

JP 6308656 B2 4/2018

OTHER PUBLICATIONS

International Search Report and Written Opinion regarding International Appl. No. PCT/US2020/048211, dated Nov. 20, 2020, 9 pps.

* cited by examiner

*Primary Examiner* — Muhammad S Siddiquee
(74) *Attorney, Agent, or Firm* — Foley & Lardner LLP

(57) ABSTRACT

A battery pack includes a housing having a positive terminal and a negative terminal. Battery cells are located within the housing and are selectively coupled to the positive terminal and coupled to the negative terminal. A battery management system is located within the housing and is configured to operate a first switch within the housing to selectively couple the battery cells and the positive terminal. A bleed circuit is electrically coupled between the positive terminal and the negative terminal. The bleed circuit includes a resistor and a second switch to selectively couple the positive terminal to the negative terminal. The battery management system is configured to open the first switch and close the second switch and measure a voltage drop across the resistor to detect a presence and type of voltage source connected to the positive terminal.

20 Claims, 19 Drawing Sheets

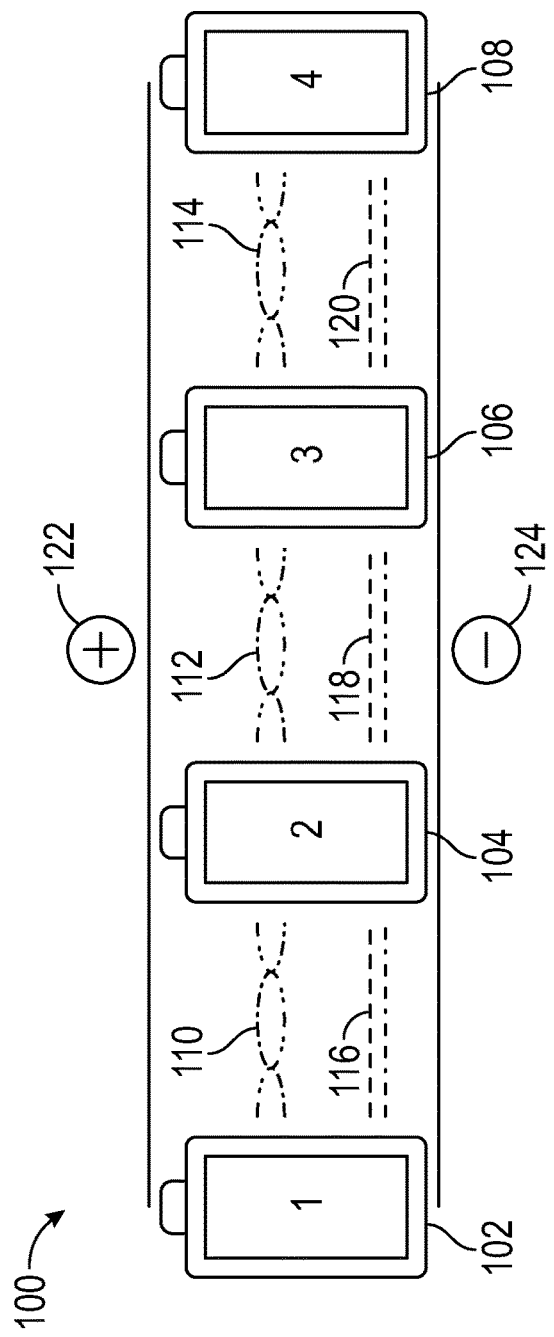
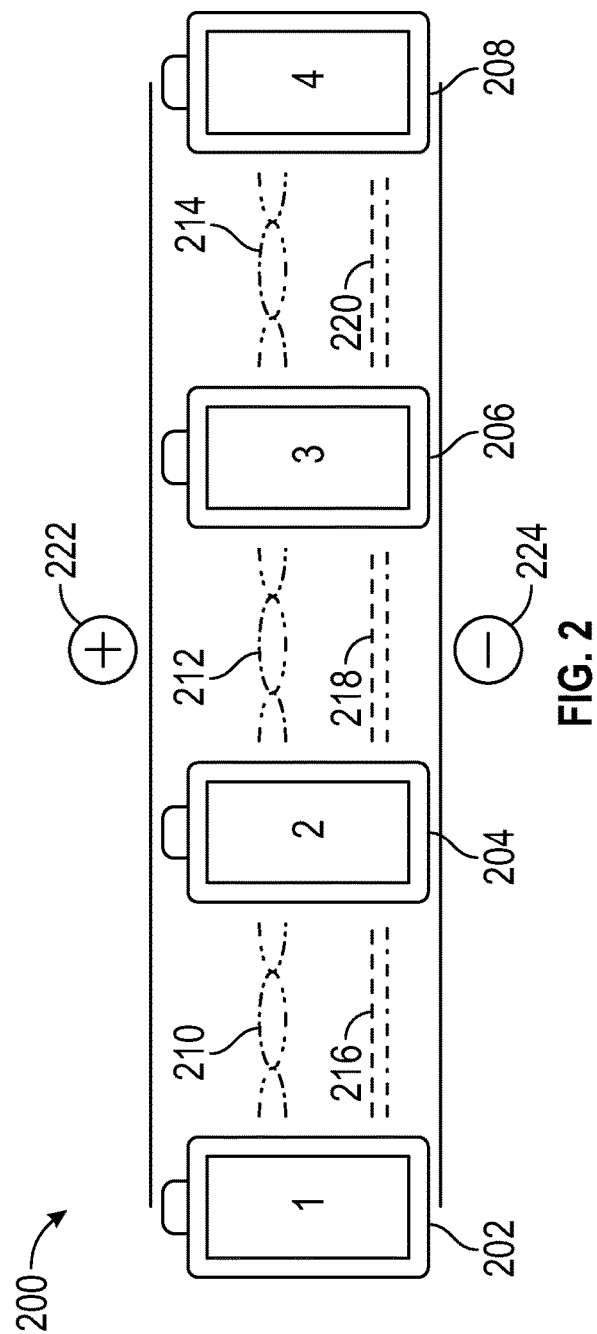
FIG. 1
FIG. 2

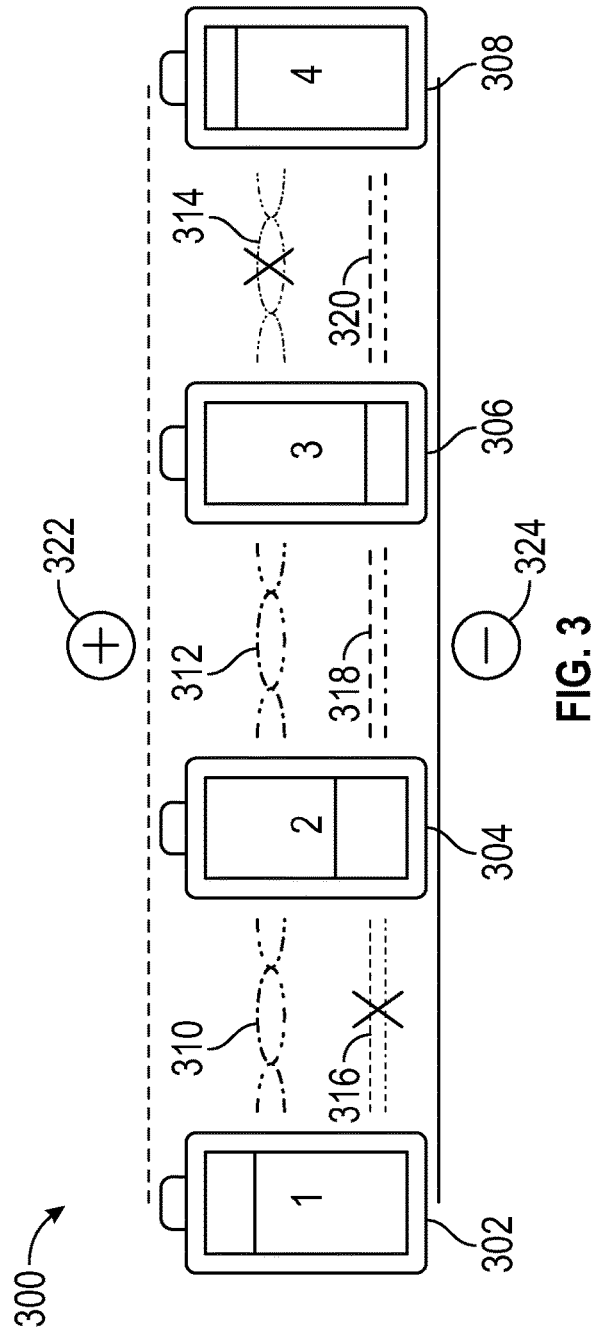
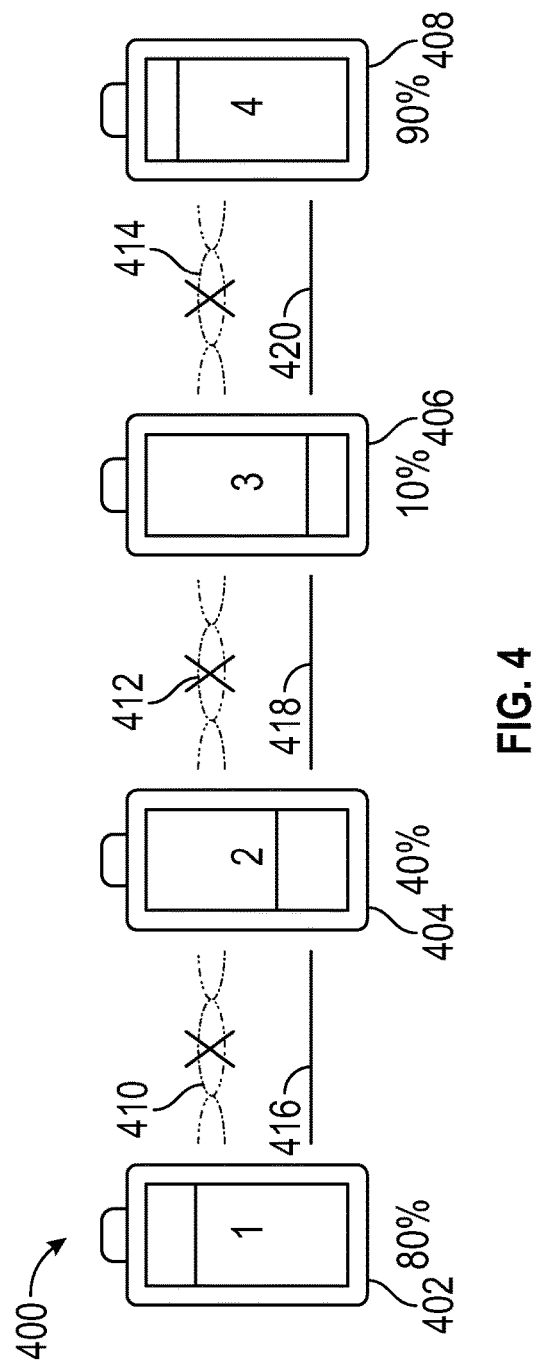

Discharge Sequencing Table

| Voltage Range | Delay (ms) | Seq. # |
|---|---|---|
| > 58.8 - 57.8 | 200 | 1 |
| > 57.8 - 56.8 | 450 | 2 |
| > 56.8 - 55.8 | 700 | 3 |
| > 55.8 - 54.8 | 950 | 4 |
| > 54.8 - 53.8 | 1200 | 5 |
| > 53.8 - 52.8 | 1450 | 6 |
| > 52.8 - 51.8 | 1700 | 7 |
| > 51.8 - 50.8 | 1950 | 8 |
| > 50.8 - 49.8 | 2200 | 9 |
| > 49.8 - 48.8 | 2450 | 10 |
| > 48.8 - 47.8 | 2700 | 11 |
| > 47.8 - 46.8 | 2950 | 12 |
| > 46.8 - 45.8 | 3200 | 13 |
| > 45.8 - 44.8 | 3450 | 14 |
| > 44.8 - 43.8 | 3700 | 15 |
| > 43.8 - 42.8 | 3950 | 16 |
| > 42.8 - 41.8 | 4200 | 17 |
| > 41.8 - 40.8 | 4450 | 18* |
| > 40.8 - 39.8 | 4700 | 19* |
| > 39.8 - 38.8 | 4950 | 20* |
| > 38.8 - 37.8 | 5200 | 21* |
| > 37.8 - 36.8 | 5450 | 22* |
| > 36.8 - 35.8 | 5700 | 23* |
| > 35.8 - 34.8 | 5950 | 24* |
| < 34.8 | 6200 | 25* |

FIG. 10

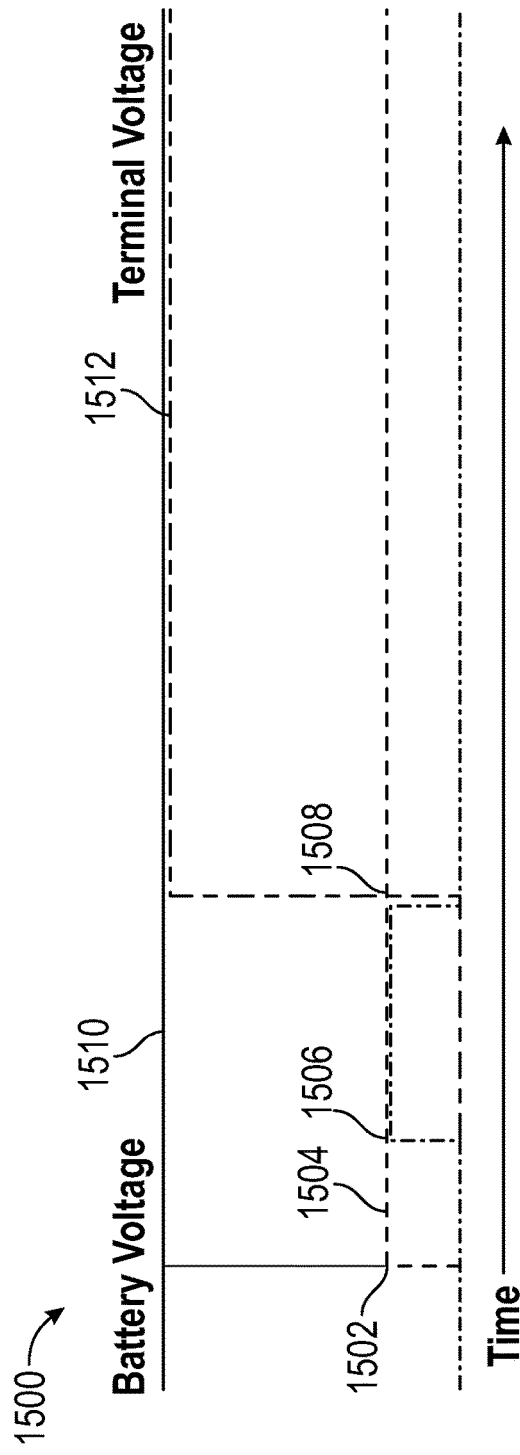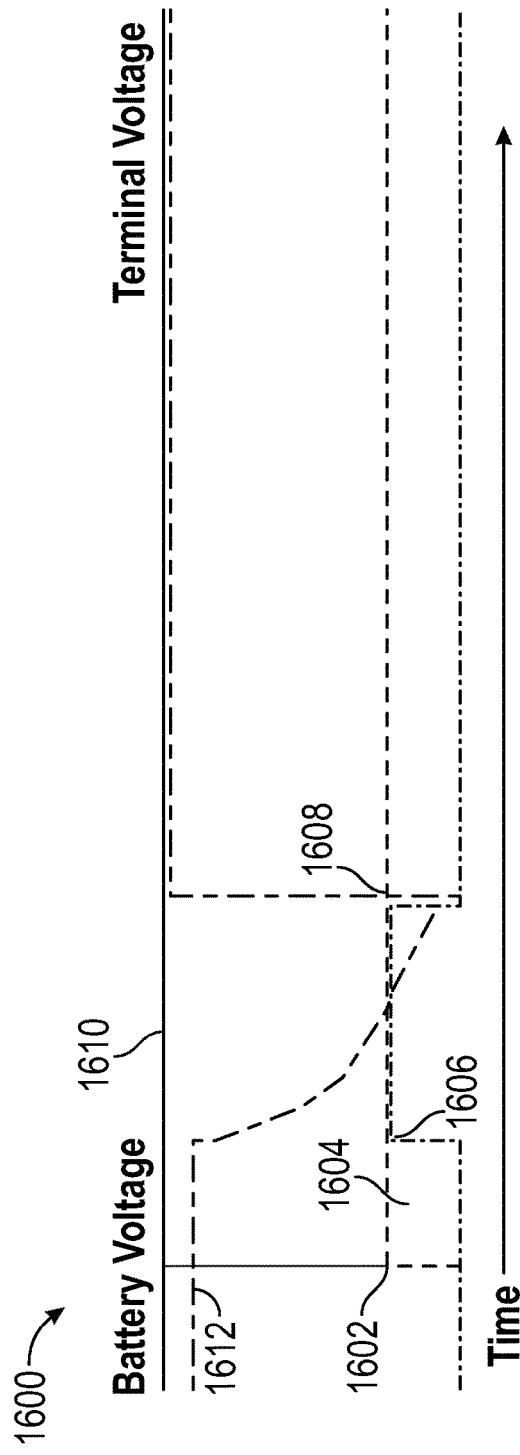

Charge Sequencing Table

| Voltage Range | Delay (ms) | Seq. # |
|---|---|---|
| < 34.8 | 200 | 1 |
| < 34.8 - 35.8 | 450 | 2 |
| < 35.8 - 36.8 | 700 | 3 |
| < 36.8 - 37.8 | 950 | 4 |
| < 37.8 - 38.8 | 1200 | 5 |
| < 38.8 - 39.8 | 1450 | 6 |
| < 39.8 - 40.8 | 1700 | 7 |
| < 40.8 - 41.8 | 1950 | 8 |
| < 41.8 - 42.8 | 2200 | 9 |
| < 42.8 - 43.8 | 2450 | 10 |
| < 43.8 - 44.8 | 2700 | 11 |
| < 44.8 - 45.8 | 2950 | 12 |
| < 45.8 - 46.8 | 3200 | 13 |
| < 46.8 - 47.8 | 3450 | 14 |
| < 47.8 - 48.8 | 3700 | 15 |
| < 48.8 - 49.8 | 3950 | 16 |
| < 49.8 - 50.8 | 4200 | 17 |
| < 50.8 - 51.8 | 4450 | 18 |
| < 51.8 - 52.8 | 4700 | 19 |
| < 52.8 - 53.8 | 4950 | 20 |
| < 53.8 - 54.8 | 5200 | 21 |
| < 54.8 - 55.8 | 5450 | 22 |
| < 55.8 - 56.8 | 5700 | 23 |
| < 56.8 - 57.8 | 5950 | 24 |
| > 57.8 | 6200 | 25 |

FIG. 20

BATTERY SYSTEM WITH PARALLEL JOINING PROTECTION

CROSS-REFERENCE TO RELATED APPLICATION

This application is a National Stage Application of PCT/US2020/048211, filed Aug. 27, 2020 which claims priority to the benefit of U.S. Provisional Patent Application No. 62/892,803, filed Aug. 28, 2019, both of which are incorporated herein by reference in their entireties. the content of which is hereby incorporated by reference in its entirety.

BACKGROUND

The present invention generally relates to the field of indoor and outdoor power equipment, and in particular, to the field of battery powered indoor and outdoor power equipment.

SUMMARY

At least one embodiment of the disclosure relates to a battery pack. The battery pack includes a housing having a positive terminal and a negative terminal. Battery cells are located within the housing and are selectively coupled to the positive terminal and coupled to the negative terminal. A battery management system is located within the housing and is configured to operate a first switch within the housing to selectively couple the battery cells and the positive terminal. A bleed circuit is electrically coupled between the positive terminal and the negative terminal. The bleed circuit includes a resistor and a second switch to selectively couple the positive terminal to the negative terminal. The battery management system is configured to open the first switch and close the second switch and measure a voltage drop across the resistor to detect a presence and type of voltage source connected to the positive terminal.

Another embodiment of the disclosure relates to a battery pack. The battery pack includes a housing having a positive terminal and a negative terminal. Battery cells are located within the housing and are selectively coupled to the positive terminal and coupled to the negative terminal. A battery management system is positioned within the housing and is configured to operate a primary contactor switch and a secondary contactor switch to selectively couple the battery cells to the positive terminal. A bleed circuit extends between the positive terminal and the negative terminal. The bleed circuit includes a resistor and a bleed switch to selectively couple the positive terminal to the negative terminal. The battery management system is configured to determine a presence of a voltage source on the positive terminal when the secondary contactor switch is in an open position. The battery management system is also configured to determine a type of the voltage source on the positive terminal when the secondary contactor switch is in a closed position and the bleed switch is in a closed position.

Another embodiment of the disclosure relates to a battery system. The battery system includes a first battery pack and a second battery pack each coupled to a terminal bus. The first battery pack provides a voltage to the terminal bus. The second battery pack includes a bleed circuit, one or more contactors, one or more battery cells, and a battery management system. The one or more battery cells are selectively coupled to the terminal bus based upon a position of the one or more contactors. The battery management system is structured to measure the voltage of the terminal bus coupled to the bleed circuit, which corresponds to an output voltage of the first battery pack. The battery management system is also configured to determine if the voltage of the terminal bus is less than a predetermined value. In response to determining that the voltage is less than the predetermined value, the battery management system is configured to engage the bleed circuit with the terminal bus to attempt to bleed down the voltage of the terminal bus. In response to determining that the voltage of the terminal bus is not bleeding down by a predetermined threshold amount, the battery management system determines if the voltage of the terminal bus is within a latching voltage range. If the battery management system determines that the voltage of the terminal bus is within the latching voltage range, the battery management system couples the battery cells to the terminal bus by closing the one or more contactors.

Another embodiment of the disclosure relates to a battery system. The battery system includes a plurality of battery packs in a parallel configuration and an independent battery pack. The independent battery pack includes a bleed circuit, a primary contactor, a secondary contactor, one or more battery cells, and a battery management system. The battery management system is structured to measure a voltage of a terminal bus coupled to the bleed circuit and measure a voltage between the primary contactor and the secondary contactor. The battery management system is further configured to delay beginning a test to couple the independent battery pack to the plurality of battery packs based on a preprogrammed value. The battery management system is further configured to engage the bleed circuit of the independent battery pack to attempt to bleed down the voltage of the terminal bus. In response to bleeding down the voltage of the terminal bus by a threshold amount, as detected by the battery management system, the battery management system is structured to couple the independent battery pack to the plurality of battery packs.

Another embodiment of the disclosure relates to a method of coupling battery packs in parallel to a common terminal bus. The method includes measuring a voltage of a terminal bus coupled to a bleed circuit of an independent battery pack. The independent battery pack includes the bleed circuit, one or more contactors, one or more battery cell assemblies, and a battery management system. The method further includes delaying a start of a test to couple the independent battery pack to a plurality of battery packs based on a predetermined value. The method further includes engaging the bleed circuit of the independent battery pack to attempt to bleed down the voltage of the terminal bus. The method further includes coupling the independent battery pack to the plurality of battery packs in response to bleeding down the voltage of the terminal bus by a threshold amount. The plurality of battery packs are arranged in a parallel configuration.

BRIEF DESCRIPTION OF THE DRAWINGS

The disclosure will become more fully understood from the following detailed description, taken in conjunction with the accompanying figures, in which:

FIG. 1 is a schematic view of a battery system with battery packs connected in a parallel configuration, according to an exemplary embodiment;

FIG. 2 is a schematic view of the battery system of FIG. 1 with the battery packs in an ideal, nominal state;

FIG. 3 is a schematic view of the battery system of FIG. 1 with the battery packs in a non-ideal state;

FIG. 4 is a schematic view of the battery system of FIG. 1 with the battery packs in an additional case scenario for the non-ideal state;

FIG. 10 is a sequencing table to be used in the paralleling process for discharging the battery system of FIG. 1;

FIG. 15 is an example of the bleed circuit sequencing for the paralleling process of discharging one of the battery packs in the battery system of FIG. 1 with only one battery present and without a terminal energy storage device;

FIG. 16 is another example of the bleed circuit sequencing for the paralleling process of discharging one of the battery packs in the battery system of FIG. 1 with only one battery present and with a terminal energy storage device;

FIG. 20 is a sequencing table to be used in the paralleling process for charging the battery system of FIG. 1;

DETAILED DESCRIPTION

Figure 5:
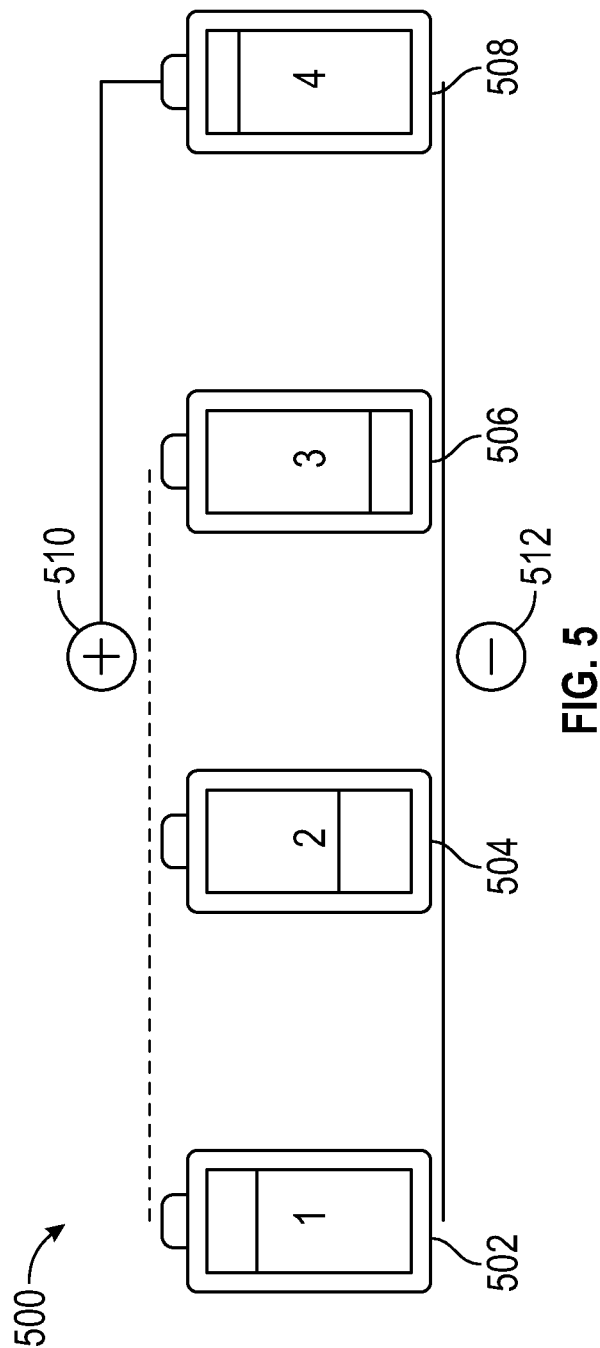
FIG. 5 is a schematic view of the battery system of FIG. 1 with the battery packs in a non-ideal state and showing the paralleling process.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to figures generally, the battery system described herein allows for multiple battery packs to be arranged in a parallel configuration in a way that avoids significant inrush or latching currents regardless of whether the battery packs are currently at the same state of charge or the same output voltage. Traditional batteries (e.g., Lithium Ion, lead acid) connected in parallel to a common terminal bus attempt to immediately balance the state of charge between batteries on the bus. If the difference in state of charge between the batteries is significant, very high currents may be experienced. Lead acid batteries, with very high internal resistances, are able to withstand the balancing of charge better, as the currents experienced by the battery are much lower due to Ohm's law. Because lithium ion batteries traditionally have a much lower internal resistance than lead acid batteries, however, lithium ion batteries are much less equipped to handle imbalance in state of charge. In some situations, differences in state of charge between batteries along the common terminal bus can result in currents of 3000A or more within the lithium ion battery, which can cause significant damage to the battery itself. The battery system disclosed is designed to protect battery packs and equipment from experiencing these large inrush or latching currents that may pose hazards to the health of battery packs, equipment, and the overall battery system by monitoring the terminal bus and only joining the terminal bus once the battery pack has determined it is safe to do so.

Battery packs within the battery system are designed so that individual battery packs can detect both the presence and type of device connected to a common terminal bus prior to joining the battery cells within the battery pack to the terminal bus. To monitor the terminal bus, the battery packs include battery management systems that monitor voltage and/or current along the terminal bus. The battery management systems operate and monitor a bleed circuit within the battery pack to detect the presence of a charge along the terminal bus. Initially, the battery management system determines whether a voltage is present on the terminal bus. If the battery management system does not detect a voltage along the terminal bus, the battery management system allows the battery pack (e.g., the battery cells within the battery pack) to join the terminal bus, as there is no detected risk of overcurrent conditions. If the battery management system does detect a voltage along the terminal bus, the battery management system will attempt to identify the type of source providing the voltage on the terminal bus.

To identify the voltage source type, the battery management system will connect the terminal bus to the bleed circuit within the battery pack and monitor the voltage drop across the bleed circuit over a period of time. If the detected voltage source is provided by the equipment itself (e.g., by a capacitor on a motor of power equipment that had stored energy, etc.), the voltage detected by the battery management system will decrease over time as the terminal bus is effectively "scrubbed" of any charge. Current is passed through the terminal bus to the bleed circuit and then to ground as the energy source dissipates. Given the exponentially decaying nature of capacitive energy sources, the battery management system determines, based on the detected rate of change in the voltage across the bleed circuit, that there are no other batteries on the terminal bus. Accordingly, the battery management system once again determines that it is safe for the battery to join the terminal bus, and coordinates internal switches to create an electrical connection between the battery cells within the battery pack and the terminal bus.

If the battery management system does not detect the voltage source depleting over time, the battery management system then knows that the voltage source is likely another battery. The battery management system then uses the bleed circuit and associated sensors to measure the voltage on the terminal bus. If the voltage on the terminal bus is within a predetermined range (e.g., +/−1.00 V) from the voltage within the battery pack, the battery management system will determine that it is once again safe for the battery to join the terminal bus, as a difference between the voltage within the battery pack and the voltage along the terminal bus will not cause a significant inrush or latching current that would damage the battery pack. The battery management system will once again coordinate internal switches to couple the battery cells to the terminal bus to allow the battery pack to discharge electricity through the terminal bus. Each battery within the battery system can include a battery management system to monitor the charge on the terminal bus to determine whether it is safe for the battery to join the terminal bus and discharge energy, such that the battery joining process can happen sequentially when all batteries are at an approximately equal state of charge.

The battery system (e.g., the battery management systems within the battery packs) will also prevent batteries from joining the terminal bus if unsafe conditions are detected. For example, if the battery management system detects the presence of another battery along the terminal bus (e.g., because the voltage is not bleeding over time, to indicate a capacitive energy source), the battery management system then detects and compares the battery voltage within the battery pack to the voltage along the terminal bus. If the difference between the two exceeds the predetermined range (e.g., +/−1.00 V), the battery management system will understand that joining the battery cells to the terminal bus may cause damage to the battery pack. Accordingly, the battery management system will leave internal switches open to prevent communication between the battery cells and the terminal bus. The battery management system will continue to monitor the voltage along the terminal bus until it is finally detected that either (1) there is no longer another voltage source along the terminal bus or (2) the voltage source along the terminal bus is within the predetermined allowable range, and it is now safe to join the terminal bus in a parallel configuration. Using the battery systems described herein, battery packs avoid potentially damaging currents that would be caused by the battery blindly joining the terminal bus in a parallel arrangement regardless of the presence of other voltage sources along the terminal bus.

Parallel battery pack configurations are often used in battery assemblies for various types of indoor and outdoor power equipment, as well as with portable jobsite equipment and military vehicle applications. Outdoor power equipment includes lawn mowers, riding tractors, snow throwers, pressure washers, tillers, log splitters, zero-turn radius mowers, walk-behind mowers, riding mowers, stand-on mowers, pavement surface preparation devices, industrial vehicles such as forklifts, utility vehicles, commercial turf equipment such as blowers, vacuums, debris loaders, overseeders, power rakes, aerators, sod cutters, brush mowers, portable generators, etc. Indoor power equipment includes floor sanders, floor buffers and polishers, vacuums, etc. Portable jobsite equipment includes portable light towers, mobile industrial heaters, and portable light stands. Military vehicle applications include installing the battery system on All-Terrain Vehicles (ATVs), Utility Task Vehicles (UTVs), and Light Electric Vehicle (LEV) applications. The parallel arrangement of battery packs is particularly useful and common in situations where the battery packs do not have predetermined or assigned equipment. Because the same battery packs may be used to power several different pieces of power equipment, the ability to determine the presence of other voltage sources along the terminal bus becomes particularly useful.

Referring to FIG. 1, battery system 100 is shown with battery packs connected in a parallel configuration, according to an exemplary embodiment. Battery system 100 may have up to four different battery packs 102, 104, 106, 108 connected together in parallel, with each positive terminal of the battery packs 102, 104, 106, 108 connecting to positive terminal bus 122 and each negative terminal of the battery packs 102, 104, 106, 108 connecting to negative terminal bus 124. Various different battery pack arrangements can be used as well. For example, the battery system 100 can have only a single battery pack 102, or can have battery pack 104, battery pack 106, and battery pack 108 connected in a parallel configuration. The battery system 100 may have more than four different battery packs connected in parallel, such as sixteen or more battery packs. The negative terminal bus 124 is connected to a common ground so that the battery pack 102, the battery pack 104, the battery pack 106, and the battery pack 108 are all grounded together. In some embodiments, the battery pack 102 and the other battery packs in system 100 are Lithium-ion batteries. In other embodiments, the battery pack 102 and the other battery packs in system 100 are different battery types (e.g., lead-acid, lithium polymer, nickel-cadmium, etc.).

In a typical situation, each battery pack 102, 104, 106, 108 in the battery system 100 is connected to a 29-bit Controller Area Network bus (CANbus) network for sending and receiving communications from other battery packs. A CANbus link 110, a CANbus link 112, and a CANbus link 114 are intact to permit network communications between the battery packs 102, 104, 106, 108 of the battery system 100. Alternatively, other digital communication protocols may be used instead of CANbus communications. For example, the digital communication protocol may use one or more of I2C, I2S, Serial, SPI, Ethernet, 1-Wire, etc. Additionally, each pack 102, 104, 106, 108 in the battery system 100 may be connected to an identical charge enable signal and an identical discharge enable signal as every other battery pack. For example, discharge enable signal 116 is connected to discharge enable signal 118 and discharge enable signal 120.

Referring to FIG. 2, battery system 200 is shown with battery packs connected in the parallel configuration as described with reference to FIG. 1 in the ideal, nominal state, according to an exemplary embodiment. In the ideal state, each battery pack in battery system 200 is charged to the same amount and therefore have identical state of charge (SOC). For example, battery pack 202, battery pack 204, battery pack 206, and battery pack 208 each have a state of charge of 75 percent of full charge capacity. Furthermore, in this state, each pack in battery system 200 also is connected to the CANbus network (e.g., CANbus link 210, CANbus link 212, and CANbus link 214 are functioning). The battery pack 202 may then communicate to the battery pack 204, the battery pack 206, and the battery pack 208 over the CANbus network. Communications may include messages pertaining to the charge of battery pack 202, or a health of battery cells within the battery pack 202, for example. Additionally, in the nominal state, the battery system 200 is configured to have every battery pack 202, 204, 206, 208 receive a charge or discharge enable signal (via discharge enable signals 216, 218, 220), respectively, at the same time as the other battery packs in battery system 200. Like the battery system 100, the battery system 200 depicts each battery pack 202, 204, 206, 208 electrically coupled to each of a positive terminal bus 222 and a negative terminal bus 224.

Referring to FIG. 3, battery system 300 is shown with battery pack 302, battery pack 304, battery pack 306, and battery pack 308 connected in the parallel configuration. Unlike the battery system 100 shown and described in FIG. 1, the battery system 300 is shown in a non-ideal state A non-ideal system state occurs when any or all of the following occur: the battery packs 302, 304, 306, 308 within the battery system 300 possess a unique state of charge compared to any of the other battery packs; one or more of the battery packs 302, 304, 306, 308 are disconnected from the 29-bit CANbus network; and/or any of the battery packs 302, 304, 306, 308 receive the respective charge or discharge enable signals at separate times from any of the other battery packs 302, 304, 306, 308. For example, if the discharge enable signal 316 for the battery pack 302 is experiencing errors in communication and not functioning correctly or if the CANbus link 314 is disconnected and not receiving or sending messages across the link 314, the battery system 300 is in a non-ideal state. A battery system with any of these conditions is undesirable because of resulting problems from having a non-ideal system state. For example, different discharge rates can occur between the battery packs 302, 304, 306, 308 and the positive terminal bus 322 or the negative terminal bus 324 that each battery pack 302, 304, 306, 308 is coupled with when the discharge enable signals 316, 318, 320 are not functioning properly.

A non-ideal state with a unique state of charge prevents two or more battery packs from joining the positive terminal bus at the same time due to resulting extremely high latching currents created by the differing states of charge. If the latching currents are not reduces or eliminated, the latching currents may cause damage to the health of the battery pack. If a battery pack 302, 304, 306, 308 within the battery system 300 is disconnected from the CANbus network and is not receiving communications from the other battery packs 302, 304, 306, 308, the battery pack may not identify the presence of other battery packs 302, 304, 306, 308 within the battery system 300, and may discharge differently. In conventional systems, if the battery pack that is disconnected attempts to join the positive terminal bus (e.g., positive terminal bus 322) that has other battery packs connected, very high and potentially damaging latching currents may result from the attempt to join the positive terminal bus 322. Furthermore, if a battery pack (e.g., battery pack 302) receives charge or discharge enable signals at a different time than any of the other battery packs (e.g., battery pack 304, battery pack 306 and/or battery pack 308), the battery pack 302 may attempt to join the positive terminal bus 322 while other battery packs are connected. Similarly, if any two or more battery packs receive an enable signal to join at the exact same time, the attempt to join to a positive terminal bus 322 can cause very high latching currents that can be damaging to both of the battery packs.

Referring now to FIG. 4, battery system 400 is shown with battery pack 402, battery pack 404, battery pack 406, and battery pack 408 in a parallel configuration that is exhibiting another non-ideal case scenario system state. In this scenario, the battery packs 402, 404, 406, 408 in the battery system 400 each have an SOC that varies drastically from the other SOCs, each battery pack is disconnected from the CANbus communication network, and each battery pack 402, 404, 406, 408 receives the discharge enable signal at the exact same time as the other battery packs. FIG. 4 depicts this scenario occurring when battery pack 402 has an SOC of 80 percent, battery pack 404 has an SOC of 40 percent, battery pack 406 has an SOC of 10 percent, and battery pack 408 has an SOC of 90 percent, CANbus link 410, CANbus link 412, and CANbus link 414 are all experiencing complications and not functioning, and discharge enable signal 416, discharge enable signal 418, and discharge enable signal 420 all occur at the exact same time.

FIG. 5 depicts a paralleling process during discharge mode that can address battery packs within a non-ideal state. Like FIG. 4, the battery system 500 is shown with all the battery packs 502, 504, 506, 508 in a non-ideal state. The paralleling process attempts to correct the non-ideal state during discharge mode, with the battery 508 attempting to join the other battery packs 502, 504, 506. During this process, with battery system 500 in a non-ideal state, two different hardware-based processes may occur. First, a battery pack (e.g., battery pack 508) in battery system 500 may determine whether positive terminal bus 510 has any other energy storage device connected to it, such as another battery pack 502, 504, 506, a capacitor, or a "bank" of capacitors (i.e., multiple capacitors in series and/or in parallel). Second, if another battery pack 502, 504, 506 is connected to positive terminal bus 510, a battery pack 508 in the battery system 500 may determine whether it is safe to join the positive terminal bus 510. Each battery management system with a battery pack 502, 504, 506, 508 will perform to protect its own battery cells and protect components of the battery pack (e.g., wirebonds, wiring, contactors, etc. within the battery pack), with the overall end goal of each battery pack supplying power to the machine (e.g., outdoor power equipment, indoor power equipment, portable jobsite equipment, military vehicle applications, etc.) in a safe manner.

Figure 6:
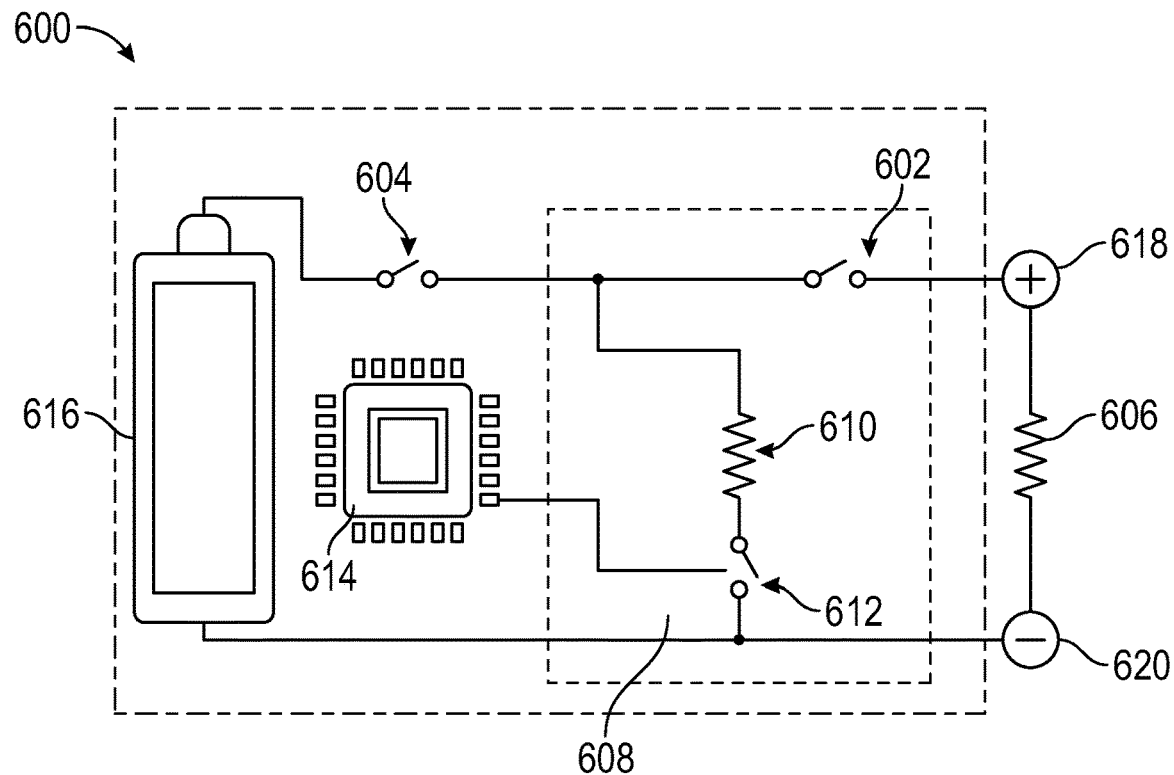
FIG. 6 is an internal schematic view of a battery pack in the battery system of FIG. 1 and a bleed circuit for the paralleling process.

Referring now to FIG. 6, an internal view of a battery pack 600 and a bleed circuit for performing the paralleling process in FIG. 5 is shown. In some embodiments, the battery pack 600 contains a primary contactor 602, a secondary contactor 604, a bleed circuit 608, a battery management system (BMS) 614, and battery cells 618. The primary contactor 602 and the secondary contactor 604 are electrical switches (e.g., MOSFETs, solid-state relays, transistors, etc.) that can be engaged to connect with a positive terminal bus, such as positive terminal bus 618. In some embodiments, a load 606 is electrically coupled between the positive terminal bus 618 and a negative terminal bus 620.

The load 606 may be the machine that BMS 614 is used to power, such as a motor of a piece of outdoor power equipment. The bleed circuit 608 may connect from the positive terminal bus 618 to a common ground at the negative terminal bus 620, described with reference to FIG. 1. The bleed circuit 608 may be designed to contain the load 610 and a solid-state relay or bleed switch 612. The load 610 may be a load "bank" including other components or may be a bleed resistor that has a dual purpose as a heating element for the battery's internal heater pad (not shown) for use in cold-weather battery packs. In other embodiments, the bleed circuit 608 contains other mechanical parts to comprise the load that can connect to the BMS 614, the positive terminal bus 618, and ground at the negative terminal bus 620.

The bleed circuit 608 can determine if the positive terminal bus 618 is connected to another energy storage device (e.g., another battery pack or a capacitor). The operation of the bleed circuit 608 begins with, internal to the battery pack 600 at the BMS 614 level, a switching device (e.g., solid-state relay 612) attempting to 'bleed' down the voltage, if present, at the positive terminal bus 618 (if a voltage is present) through the load 610 to ground at the negative terminal 622. The bleed circuit 608 then monitors how quickly the voltage decays. For example, if the voltage at the positive terminal bus 618 was 40V and the bleed circuit 608 sees a drop in voltage to 30V, there is a 25% change in voltage from the bleed circuit 608. If the voltage decay rate that the bleed circuit 608 observes is very high (e.g., 90 percent or higher), then a capacitive energy storage device may be present and it is safe for battery pack 600 to join in parallel to the battery system (e.g., battery system 100, 200, 300, 400). However, if the voltage decay rate is very low (e.g., below 10 percent), meaning there was no change or very little change in the terminal bus voltage across the bleed circuit 608, then another battery pack or energy storage device (e.g., a 12V lead-acid battery, or an unauthorized charger) is connected to the positive terminal bus 618 and it may be unsafe for battery pack 608 to join in parallel to the existing battery system.

Figure 7:
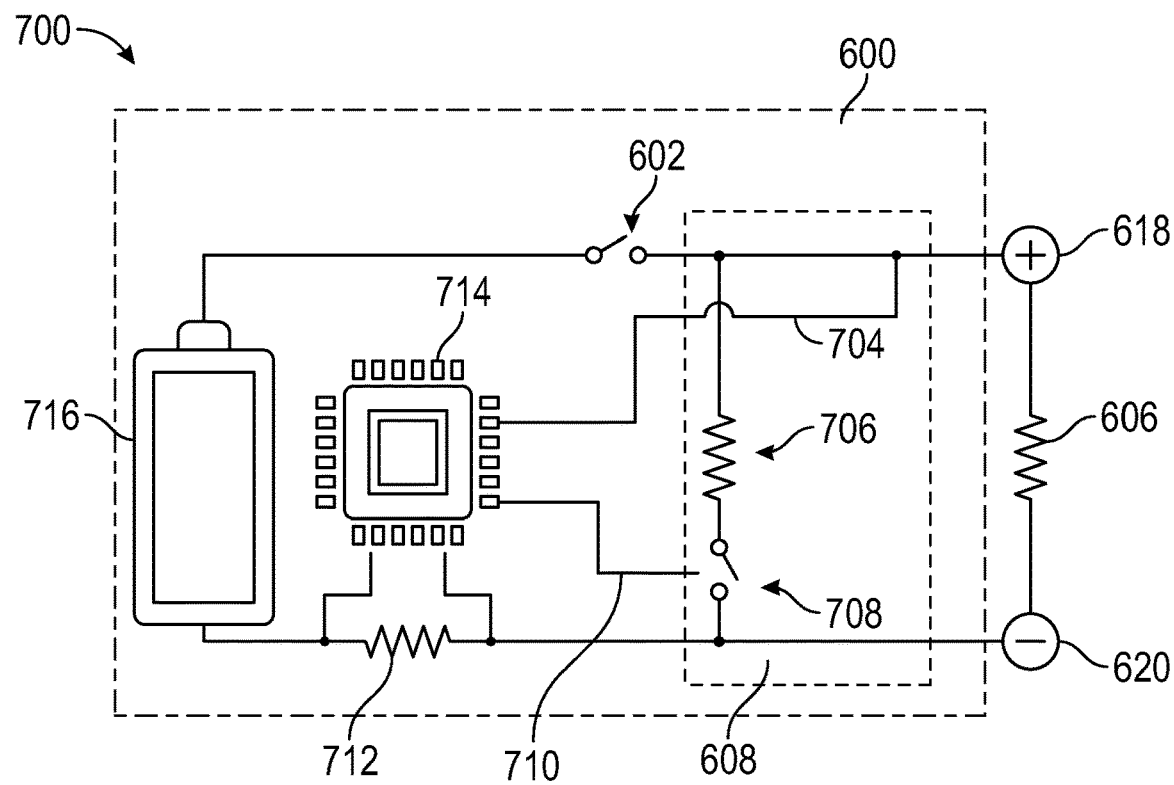
FIG. 7 is an internal schematic view of a battery pack in the battery system of FIG. 1, showing a bleed circuit functional schematic.

Referring to FIG. 7, a functional schematic 700 of the bleed circuit 608 in the battery pack 600 is shown. A BMS 714 (which can be similar to the BMS 614) may connect to the positive terminal bus 618 through a primary (terminal) voltage sense 704. Future output 710 from the BMS 714 may connect to a solid-state relay 708 (e.g., a Field Effect Transistor (FET), a Transistor, an Insulated-Gate Bipolar Transistor (IGBT), etc.) and the positive terminal bus 618 through a bleed resistor 706. The bleed circuit 608 may bleed down the voltage at the positive terminal bus 618 through the bleed resistor 706 and the solid-state relay 708 to a common ground at the negative terminal bus 620. In some embodiments, the bleed resistor 706 has a resistance value of 10 Ohm. The BMS 714 can be connected to an internal pack current sensor 712, which is connected to the negative terminal bus 620 to be grounded. The internal pack current sensor 712 may be a shunt resistor, for example. Battery cells 716 may connect at their respective positive end to a primary contactor 702, at their respective negative ends to common ground at the negative terminal bus 620, and to the BMS 714 so that the battery management system is aware of the state of battery cells 716. The primary contactor 702, when engaged, connects the battery cells 716 to the positive terminal bus 618. In other embodiments, the battery pack 600 also includes a pre-charge relay (e.g., pre-charge relay 1128, shown in FIG. 11) that can help protect the primary contactor 702 (or primary contactor 1102) in addition to the function of the bleed circuit 608. The pre-charge relay may slow down the change in voltage over time to help prevent an inrush of current, which can be damaging to battery pack components.

Figure 8:
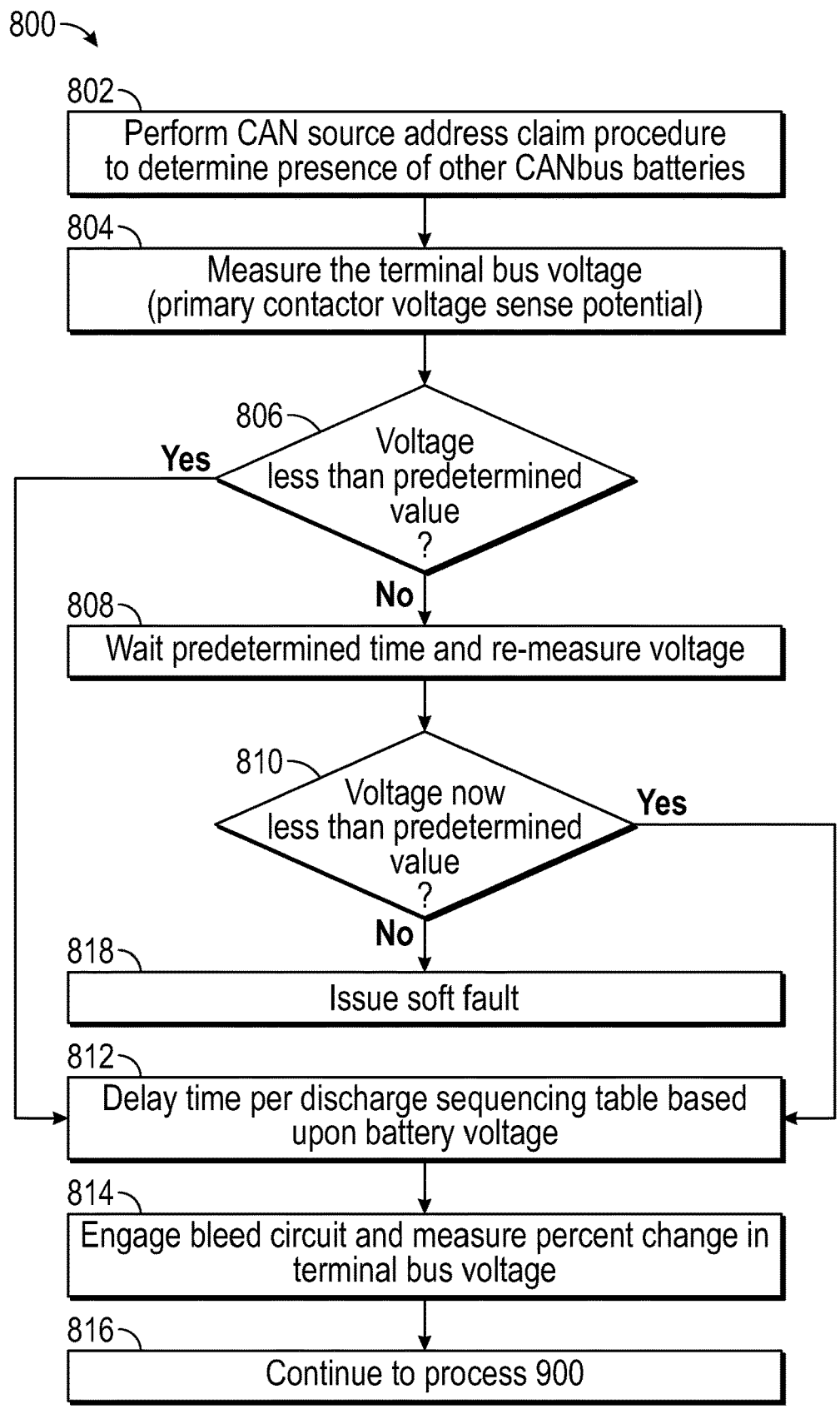
FIG. 8 is a flowchart of a process for determining ability of a battery pack to join in parallel with other battery packs of the battery system of FIG. 1 using the bleed circuit of FIG. 7 to discharge, according to some embodiments.

Referring now to FIG. 8, an automated process 800 for determining an ability of a battery pack (e.g., battery pack 102) to join in parallel with other battery packs (e.g., battery packs 104, 106, 108) of the battery system (e.g., battery system 100, 200, 300, 400, etc.) using a bleed circuit (e.g., bleed circuit 608) to discharge is shown. The process 800 can be executed in part by an application associated with the BMS 714. This process 800 can be used to prevent damage to battery packs while joining a battery system that has a parallel configuration from high inrush current (e.g., 3000 Amps of current). The process 800 begins at step 802 by performing a CAN source address claim procedure to determine if other batteries are present on the CANbus network. Step 802 may occur at some predetermined time from the discharge enable signal input, such as 1.5 seconds. The predetermined time from the discharge enable signal input can be exactly the same amount of time regardless if any other battery is found present. The presence or lack of any other CAN-enabled batteries is recorded and potentially acted on by the battery system (e.g., if other batteries are found, the digital communication may trump the hardware-level paralleling scheme and the batteries may immediately join the terminal). Next, at step 804, the process 800 includes measuring a primary contactor 702 voltage sense potential, which corresponds to the terminal bus voltage. The BMS 714 then determines if the measured voltage is greater than or less than a predetermined value at step 806. If the BMS 714 finds that the voltage is greater than a predetermined value, the BMS 714 waits a predetermined time and then re-measures the voltage at step 808. Next, the BMS 714 determines if the new voltage that is re-measured is now less than the predetermined value at step 810.

If the new voltage value is still too high, the BMS 714 issues a soft fault at step 818. For example, if the predetermined value is 60V and the re-measured value is still greater than 60V after waiting 10 seconds from the first measurement, the BMS 714 may issue a soft fault for High Terminal Bus Voltage.

Alternatively, if in step 806 it is found that the voltage is less than the predetermined value, the process 800 proceeds to delaying time according to a discharge sequencing table, based upon the measured battery voltage at step 812. After the delay in time from step 812, to the BMS engages the bleed circuit (e.g., bleed circuit 608) and measures the percent change in terminal bus voltage at step 814. Once the change in terminal bus voltage is measured, process 800 ends at step 816. With the process 800 concluded, the process 900 can begin, as depicted in FIG. 9.

Figure 9:
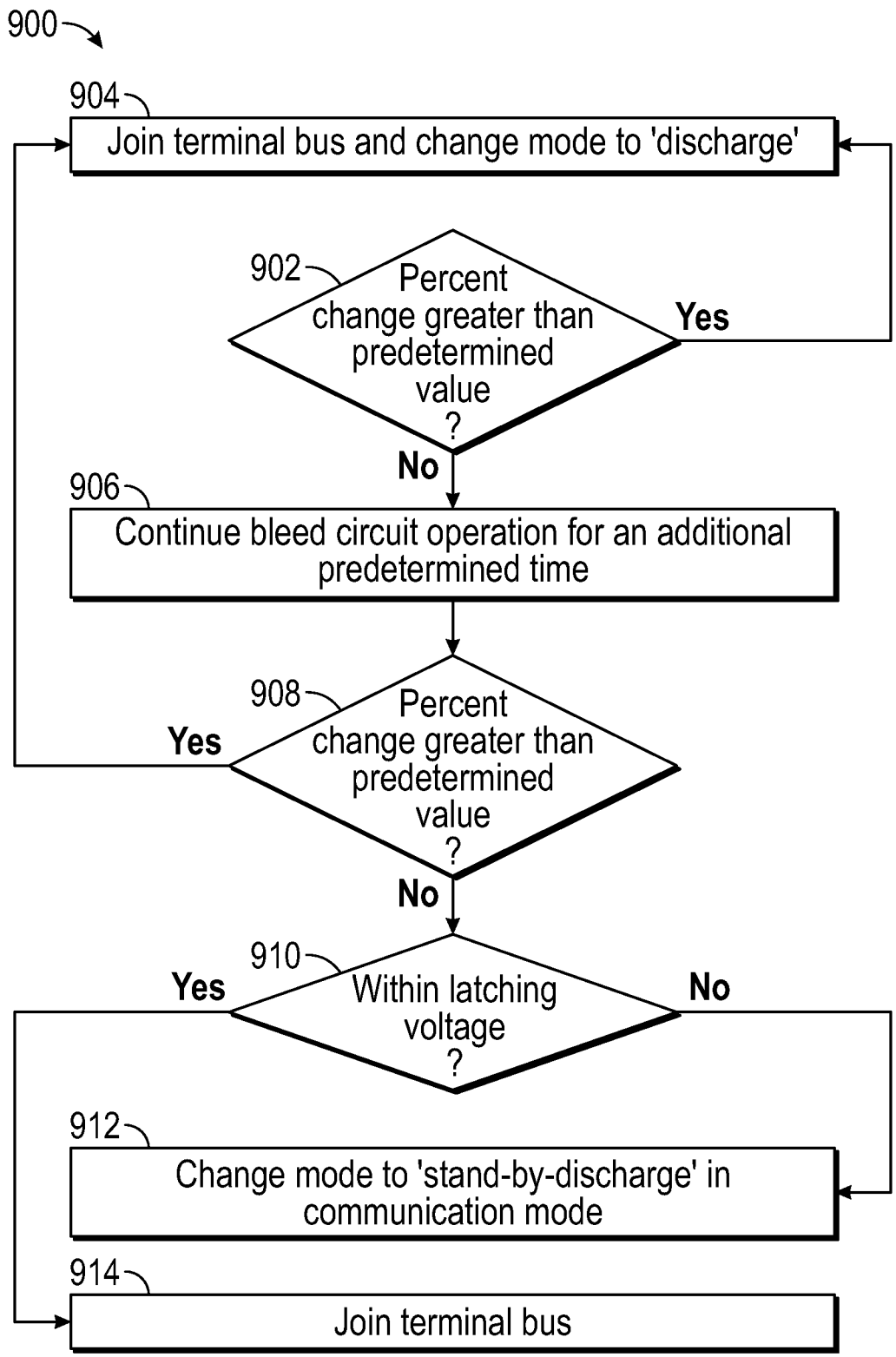
FIG. 9 is a flowchart of a process that continues from the process of FIG. 8, for determining an ability of a battery pack to join in parallel with other battery packs using the bleed circuit of FIG. 7 to discharge, according to some embodiments.

Referring now to FIG. 9, a process 900 for determining an ability of a battery pack to join in parallel with other battery packs using the bleed circuit to discharge is shown, according to an exemplary embodiment. The process 900 can begin at the conclusion of the process 800 (e.g., from block 816). In some embodiments, the process 900 begins with the BMS 714 determining if the percent change in the terminal bus voltage after the voltage 'bleeds' down the bleed circuit 608 is greater than a predetermined value at step 902. If the BMS 714 detects that the percent change is greater than the predetermined value (e.g., above 90 percent), the process 900 proceeds to step 904, where the battery pack joins the terminal bus (by engaging the primary contactor) and changes modes to 'discharge.' For example, if the percent change is greater than 15 percent by 100 milliseconds (ms), the primary contactor 702 engages and the battery pack 600 joins the positive terminal bus 122 and enters 'discharge' mode.

Instead, if the BMS 714 detects that the percent change is less than a predetermined value in step 902, the process 900 continues to step 906, where the BMS 714 continues bleed circuit operation for an additional predetermined time. In some embodiments, the predetermined value is 15 percent within 100 ms and the additional predetermined time that bleed circuit operation continues is 50 ms, giving a total amount of time of 150 ms.

After the additional predetermined time has elapsed, the BMS 714 may determine if the percent change is now greater than the predetermined value again, at step 908. If after the additional time, the percent change is high enough, the process 900 proceeds to block 904 and the battery pack joins the terminal bus. If the percent change is still not high enough after step 906, process 900 proceeds to determine if the battery pack is within a latching voltage at step 910. If the battery pack is not within a latching voltage, the BMS 714 changes a mode of the battery pack to 'stand-by-discharge' in communication mode at step 912. However, if the battery pack is within latching voltage, process 900 proceeds to step 914, where the battery pack joins the terminal bus. For example, if battery pack 600 is within latching voltage (as determined by the BMS 714, for example), the primary contactor 702 engages, and the battery pack 600 joins the positive terminal bus 122 because another battery is present and within latching range.

FIG. 10 depicts a discharge sequencing table 1000 that can be used in the paralleling process for battery system 100, such as the process 800 described with reference to FIG. 8. In some embodiments, the discharge sequencing table 1000 includes low voltage area 1002, a voltage range column 1006, a delay column 1004, and a sequence number column 1008. The low voltage area 1102 highlights voltage ranges that fall below the minimum activation (start-up) Threshold Voltage that is required (e.g., lower than 41.8V). The voltage range column 1006 can be used during step 812 in process 800 to find the corresponding delay in ms to the measured terminal bus voltage value. For the discharge sequencing table 1000, the standard latching voltage is set to +/−1.00V and the incremental delay time for the next sequence is an added 250 ms. In some embodiments, a blind (no CANbus communication network) hardware-paralleled system has three battery packs already joined (i.e., latched) together when a fourth battery pack tries to join. For this example, a 1.00V differential voltage may cause a 40A instantaneous balancing current, which is still safe for the joining battery pack to experience.

Figure 11:
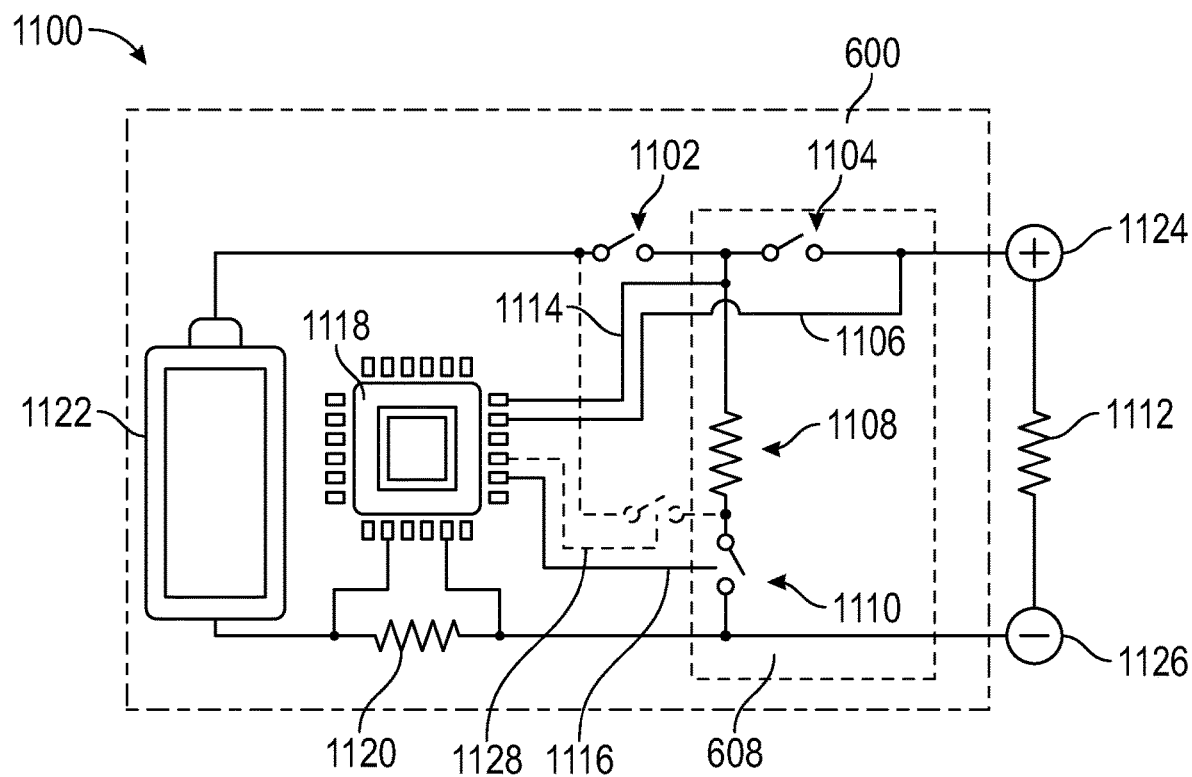
FIG. 11 is an internal schematic view of one of the battery packs in the battery system of FIG. 1, showing another embodiment of a bleed circuit functional schematic.

Referring to FIG. 11, another battery pack 1100, which may be used in battery system 100, is shown. The battery pack 1100 includes a BMS 1118, which may connect to a positive terminal bus 1124 through a primary (i.e., terminal) voltage sense 1106. The BMS 1118 may connect in between a primary contactor 1104 and a secondary contactor 1102 through a secondary voltage sense 1114. The secondary voltage sense 1114 can be internally pulled to ground via a high-resistance resistor to avoid stay voltage in the circuit. A bleed signal 1116 may connect to switching device 1110, which is grounded to common ground at a negative terminal 1126. In some embodiments, the bleed signal 1116 connects to the switching device 1110 and between the secondary contactor 1102 and the primary contactor 1104 through the bleed resistor 1108. The bleed resistor 1108 may have a resistance in the range of 1 to 100 Ohms (e.g., resistor 1108 is a 20-Ohm resistor). The BMS 1118 may be connected to an internal pack current sensor 1120, which is then connected to ground through the negative terminal bus 124 and may be similar or identical in resistance to internal pack current sensor 712 as described with reference to FIG. 7. The internal pack current sensor 1120 may be a shunt resistor or may be another type of sensor (e.g., a Hall Effect sensor) instead of a shunt resistor. A machine (i.e., load) 1112 can be a variety of equipment, such as controllers for outdoor power equipment, indoor power equipment, portable jobsite equipment, military vehicle applications, etc. Battery cells 1122 may connect at their respective positive end to the secondary contactor 1102, at their respective negative ends to the common ground at negative terminal bus 1126, and to the BMS 1118 so that the battery management system is aware of the state of the battery cells 1122 within the battery pack 600. When both the secondary contactor and the primary contactor are engaged, battery cells 1122 may be connected to the positive terminal bus 1124. As explained above, the battery pack 1100 can include a pre-charge relay 1128 positioned in series with the battery cells 1122, the bleed switching device 1110, the internal pack current sensor 1120, and the negative terminal of the battery cells (which may be coupled to the negative terminal bus 1126).

Figure 12:
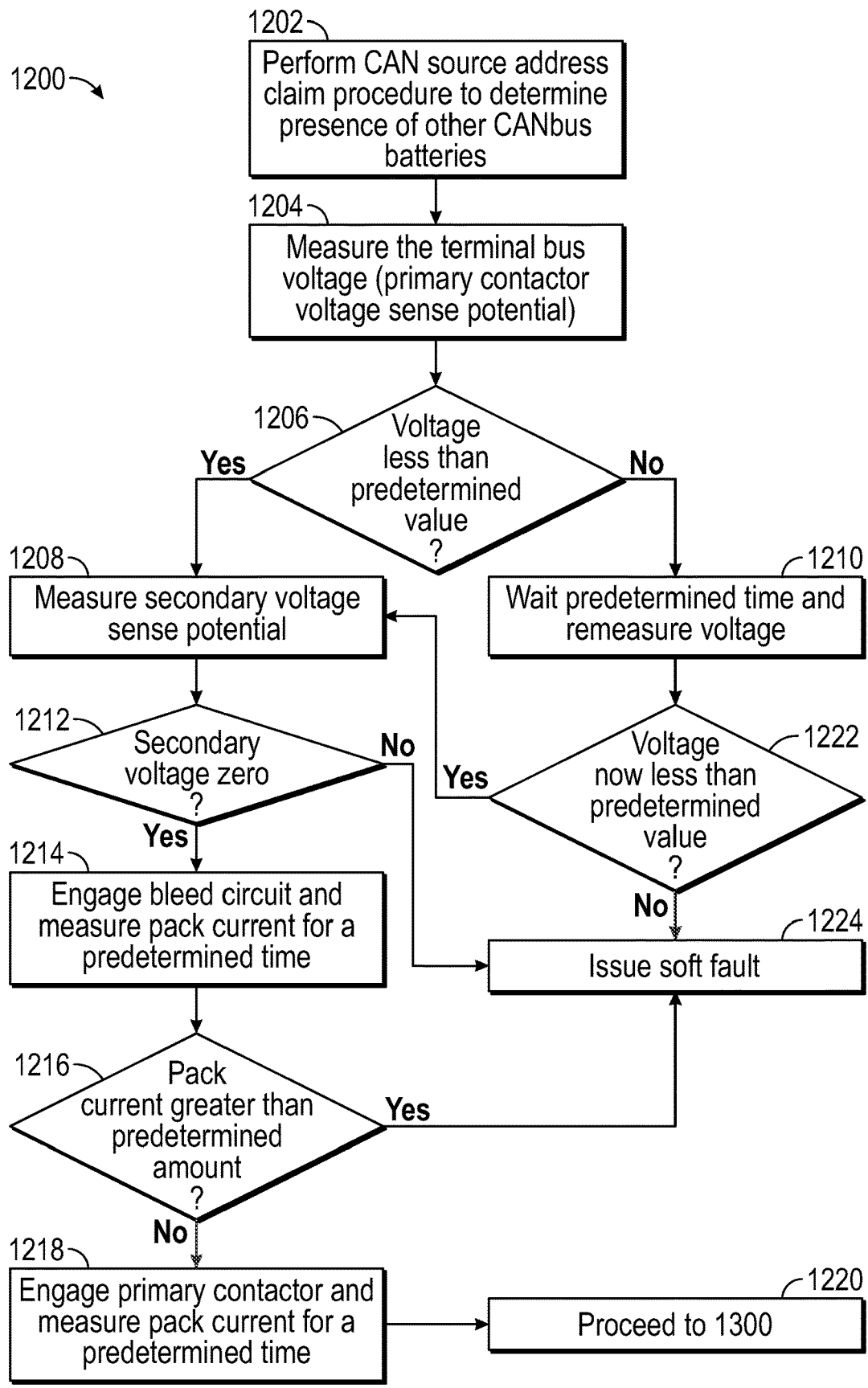
FIG. 12 is a flowchart of a process for determining ability of a battery pack to join in parallel with other battery packs of the battery system of FIG. 1 using the bleed circuit of FIG. 11 to discharge, according to some embodiments.

Referring to FIG. 12, an automated process 1200 for determining ability of a battery pack to join in parallel with other battery packs using a bleed circuit to discharge is shown. Process 1200 is shown to include performing a CAN source address claim procedure at step 1202 to determine if other batteries are present on the CANbus network. Step 1202 may occur some predetermined time from the discharge enable signal input, such as 1.5 seconds, which can be exactly the same amount of time regardless if any other battery is found present. The presence or lack of any other CAN-enabled batteries is recorded (e.g., by the BMS 1118). At step 1204, the voltage sense potential of primary contactor 1104 (i.e., terminal bus voltage) is measured (e.g., by the BMS 1118). In some embodiments, the BMS 1118 determines if the measured voltage is greater than or less than a predetermined value at step 1206. If in step 1206 it is found that the voltage is greater than a predetermined value, the BMS 1118 proceeds to step 1210, and waits a predetermined time before restarting the process to re-measure the voltage.

At step 1222, after waiting the predetermined time period, the BMS 1118 determines if the new voltage that is re-measured is now less than the predetermined value. If the new voltage value is still greater, a soft fault is issued at step 1224. For example, if the predetermined value is 60V or greater than 60V and the re-measured value is still greater than 60V after waiting 10 seconds and restarting the procedure, the BMS 1118 may issue a soft fault for High Terminal Bus Voltage. Instead, if in step 1206 it is found that the voltage is less than the predetermined value, the process 1200 advances to step 1208, where the BMS 1118 measures the secondary (contactor) voltage sense potential. At step 1212, the BMS 1118 checks if the measured secondary voltage is zero, which may indicate that there is an issue with the primary contactor. If the secondary voltage is not 0V, the BMS 1118 issues a soft fault in step 1224 that there may be a primary contactor failure.

However, if the secondary voltage is 0V, process 1200 continues to step 1214, where the BMS 1118 engages the bleed circuit (e.g., bleed circuit 608) and measures the current of the battery pack for a predetermined time. After the battery pack current is measured, the BMS 1118 determines whether the current exceeds a predetermined amount at step 1216. For example, the battery current may be measured for 10.0 ms and evaluated to see if the absolute value of the current is larger than 1A of current. If the battery pack current exceeds the predetermined amount, the process 1200 again proceeds to step 1224, where the BMS issues a soft fault that there may be a secondary contactor and/or secondary voltage sense failure. Instead, if the current measured in step 1214 is lower than the predetermined amount, process 1200 continues to step 1218, where the primary contactor is engaged and the battery pack current is measured again for a predetermined time. After step 1218, the process 1200 can continue to step 1220, which corresponds to the beginning of a process 1300.

Figure 13:
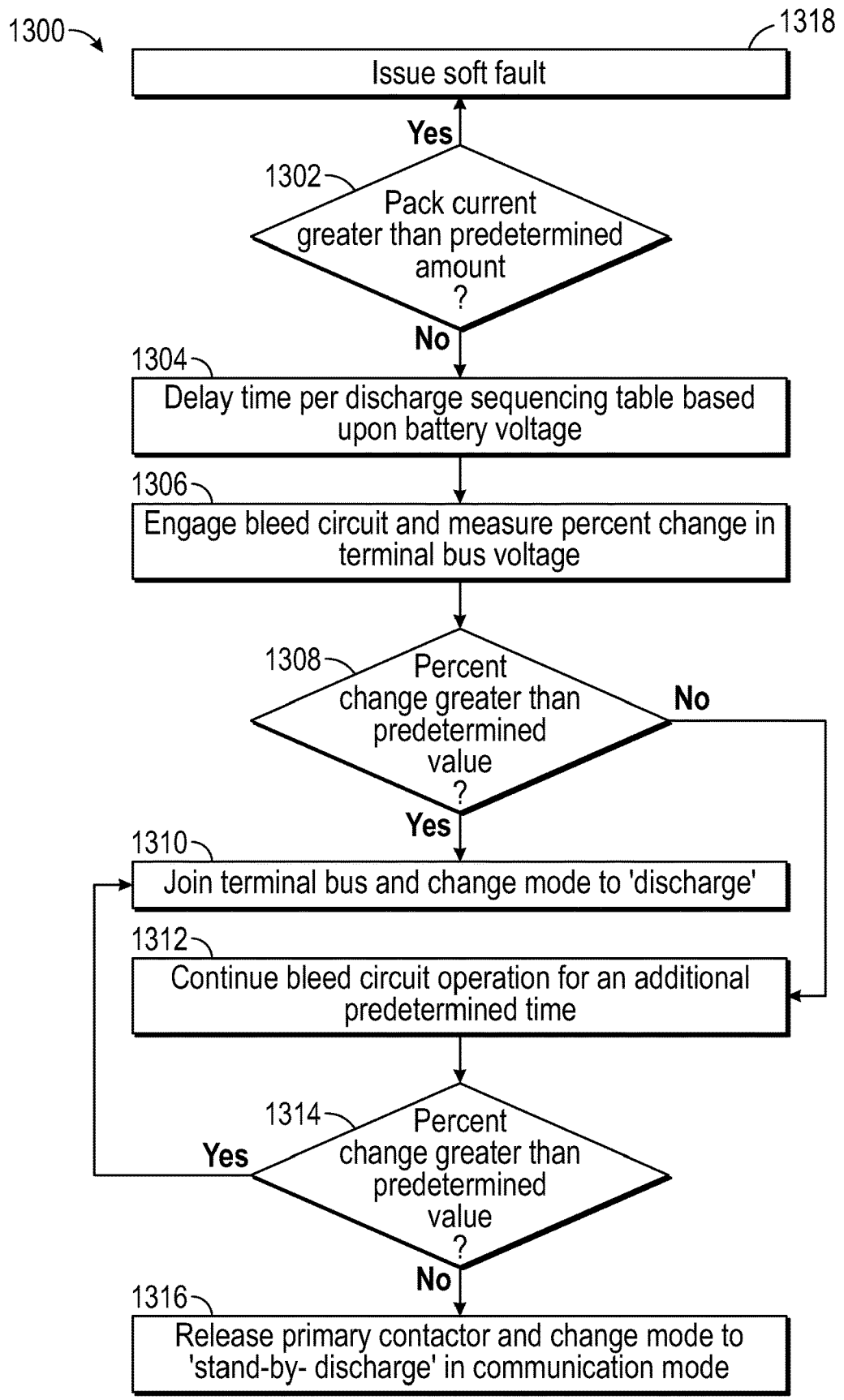
FIG. 13 is a flowchart of a process that continues from the process of FIG. 12, for determining ability of a battery pack to join in parallel with other battery packs of the battery system of FIG. 1 using the bleed circuit of FIG. 11 to discharge, according to some embodiments.

Referring to FIG. 13, an automated process 1300 for determining the ability of a battery pack to join in parallel with other battery packs using a bleed circuit to discharge is shown. The process 1300 begins with the BMS 1118 determining whether the current exceeds a predetermined amount at step 1302. For example, the battery current may have a predetermined limit of 1A. Accordingly, the BMS 1118 needs to verify the absolute value of the current does not have more than 1A of current. If the BMS 1118 detects that the battery pack current exceeds the predetermined amount, the process 1300 proceeds to step 1318, and the BMS 1118 issues a soft fault that there may be a bleed circuit 608 failure. If the current measured in step 1302 is lower than the predetermined amount, process 1300 advances to step 1304, and delays time for a predetermined amount of time determined by a discharge sequencing table (e.g., discharge sequencing table 1000). The predetermined amount of time can be based upon the voltage of the battery pack. Once the predetermined time period has elapsed, the BMS 1118 can engage the bleed circuit and measure the percent change in terminal bus voltage (i.e., primary voltage sense potential) at step 1306. If the change in percent of the terminal bus voltage after operating bleed circuit 608 is greater than a predetermined value at step 1308, as determined by the BMS 1118, the BMS 1118 can prompt the battery pack to join the terminal bus by engaging the secondary contactor and changing the mode of the battery pack to 'discharge' at step 1310.

In some embodiments, if the percent change is greater than 15 percent by 100 ms, the secondary contactor 1102 engages and the battery pack 600 joins the positive terminal bus 122 and enters 'discharge' mode.

However, if it is found that the percent change is lower than a predetermined value at step 1308, the process 1300 proceeds to step 1312, where the BMS 1118 continues bleed circuit operation for an additional predetermined time. In some embodiments, the predetermined value is 15 percent by 100 ms and the additional predetermined time that bleed circuit operation continues is 50 ms, with an overall amount of time of 150 ms. At step 1314, the BMS 1118 determines if the percent change is now greater than the predetermined value. If the percent change is determined to be high enough after the additional bleed circuit operation at steps 1312 and 1314, the process 1300 proceeds to step 1310, where the BMS 1118 causes the secondary contactor 1102 to join the terminal bus (e.g., positive terminal bus 122) and changes the mode to 'discharge' at step 1310. However, if the percent change is too low even after the added time of operating the bleed circuit, the process 1300 proceeds to step 1316 by changing a mode of the battery pack to 'stand-by-discharge' in communication mode. In some embodiments, the goal of paralleling during discharge mode is for all battery packs to join the positive terminal bus within 3 seconds. Overall, in discharge mode, the battery comes onto the common positive terminal bus (e.g., positive terminal bus 122) with the timing based on individual pack voltage and then tries to bleed the voltage of the terminal bus down. If the battery can bleed the voltage, the battery may join, but if the bleed circuit does not bleed down the voltage, the battery may determine if it is safe to join. Then the battery may join the parallel configuration if the battery has determined that it is safe to join. Otherwise, if it is not safe to join, the battery may wait to join and continue to monitor the voltage on the terminal bus until it is safe to do so. This may be determined using some or all of the same steps as in processes 1200 and 1300, repeated until it is found that the battery is able to join safely after successfully bleeding down the voltage of the terminal bus.

Figure 14:
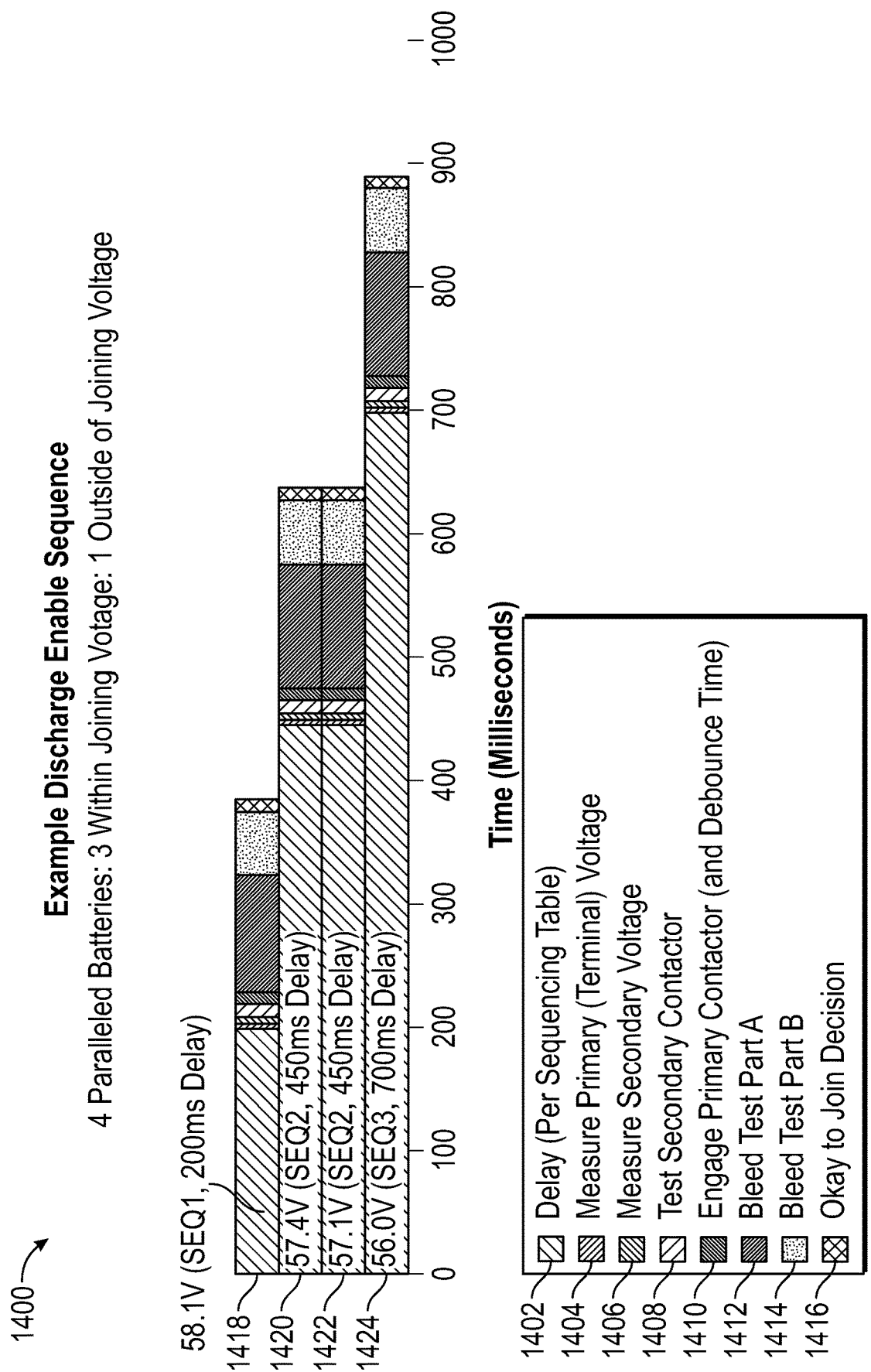
FIG. 14 is an example of a bleed circuit sequencing timeline for discharging one of the battery packs in the battery system of FIG. 1.

Referring to FIG. 14, example of a bleed circuit timeline sequencing for discharging one of the battery packs in the battery system of FIG. 1, according to an exemplary embodiment. All battery packs (e.g., battery packs 102, 104, 106, 108) receive the same discharge enable signal at the same time. Per the discharge sequencing table 1000, as described with reference to FIG. 10, the first battery pack 1418 at 58.1V has an assigned delay time of 200 ms, with delay 1402 shown in gray, before starting a bleed test using its bleed circuit (e.g., bleed circuit 608). Because battery packs 1420, 1422 have measured voltages between 56.8-57.8V, the battery pack 1420 and battery pack 1422 have an assigned delay 1402 of 450 ms. Battery pack 1424 has a delay 1402 of 700 ms before starting its bleed test. Battery pack 1418, battery pack 1420, battery pack 1422, and battery pack 1424 each attempt to join the battery system, such as battery system 100, in the parallel configuration. In some embodiments, the timeline sequencing for bleed circuit 608 has an order of: Delay 1402, Measure Primary (terminal) Voltage 1404, Measure Secondary Voltage 1406, Test Secondary Contactor 1408, Engage Primary Contactor (and debounce time) 1410, Bleed Test Part A 1412, Bleed Test Part B 1414, and OKAY to Join Decision 1416. In other embodiments, Bleed Test Part B 1414 is not necessary before the battery pack receives the OKAY to join decision. Bleed Test Part A may be 100 ms for each battery pack and Bleed Test Part B may be an added 50 ms for each battery pack. Bleed Test Part B 1414 may only be needed for machines with especially large capacitance, necessitating an extended time for the test. Battery pack 1418, battery pack 1420, and battery pack 1422 may all join the terminal bus after "OKAY to Join Decision" 1416 due to their respective measured terminal voltages, which may be measured in step 1204 of process 1200, being within joining voltage, such as 1.00V of another battery pack on the terminal bus. However, battery pack 1424 has an example terminal voltage of 56.0V and is outside of the joining voltage. Therefore, battery pack 1424 waits in 'stand-by' mode to join when it becomes safe for the battery pack (e.g., the SOC of the other battery packs 1418, 1420, 1422 has reduced to within the 1.00 V range.

Referring to FIG. 15, paralleling example 1500 of the bleed circuit sequencing for the paralleling process of discharging a battery pack, such as battery pack 1100 to join battery system 100, is shown, according to an exemplary embodiment. In paralleling example 1500, only one battery pack is present (i.e., non-paralleled) and the system does not have a terminal energy storage device, such as a capacitor or another battery pack. At time 1502, a battery management system (e.g., BMS 1118) receives the discharge enable signal. At 1504, BMS 1118 waits a predetermined amount of time per discharge sequencing table 1000 based on battery pack voltage 1510. After the predetermined amount of time from when the discharge enable signal is received at time 1502, BMS 1118 engages its bleed circuit at time 1506 to test whether there is a terminal energy storage device on the terminal bus. Then, at time 1508, if BMS 1118 finds it safe, BMS 1118 engages all contactors (e.g., secondary contactor 1102 and primary contactor 1104) to join terminal. In paralleling example 1500, it is determined safe (i.e. OKAY to Join) because at time 1508 there was no terminal voltage present, meaning no other capacitors or batteries existed on the terminal.

Referring to FIG. 16, paralleling example 1600 of the bleed circuit sequencing for the paralleling process of discharging a battery pack, such as battery pack 1100 to join battery system 100, is shown, according to an exemplary embodiment. In paralleling example 1600, only one battery pack is present (i.e., non-paralleled) and the system (e.g., the piece of equipment coupled to the terminal bus) has a terminal energy storage device, such as a capacitor or another battery pack. At time 1602, a battery management system (e.g., BMS 1118) receives the discharge enable signal. At 1604, BMS 1118 waits a predetermined amount of time according to the discharge sequencing table 1000 based on the battery pack voltage 1610. Once the predetermined delay ends from when the discharge enable signal is received at time 1602, BMS 1118 engages its bleed circuit at time 1606 to test for the presence of a terminal energy storage device, such as a battery pack or capacitor. Next, at time 1608, if BMS 1118 determines it is safe, BMS 1118 engages all contactors (e.g., secondary contactor 1102 and primary contactor 1104) to join the terminal (e.g., positive terminal bus 122). In paralleling example 1600, it is found safe (i.e. OKAY to Join) because the bleed circuit was able to bleed terminal voltage 1612, meaning the terminal energy storage device connected is a capacitor and not a battery.

Figure 17:
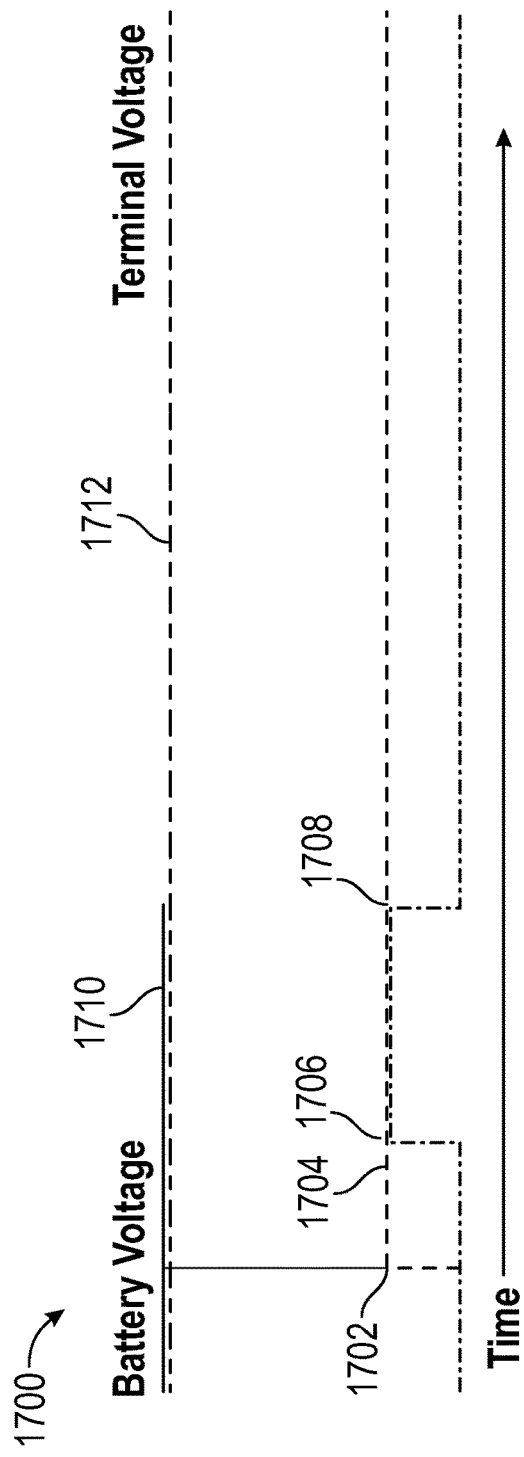
FIG. 17 is another example of the bleed circuit sequencing for the paralleling process of discharging one of the battery packs in the battery system of FIG. 1 with only one battery present and with a terminal energy storage device.

Referring to FIG. 17, paralleling example 1700 of the bleed circuit sequencing for the paralleling process of discharging a battery pack, such as battery pack 1100 to join battery system 100, is shown, according to an exemplary embodiment. In paralleling example 1700, only one battery pack is present (i.e., non-paralleled) and the system has a terminal energy storage device. At time 1702, a battery management system (e.g., BMS 1118) receives the discharge enable signal. At 1704, BMS 1118 waits for a period of delay per discharge sequencing table 1000 based on battery voltage 1710. After the predetermined delay has elapsed, at time 1706 BMS 1118 engages its bleed circuit to test for a terminal energy storage device connection to the terminal bus. Then, at time 1708, if BMS 1118 finds it safe, the BMS 1118 engages all contactors (e.g., secondary contactor 1102 and primary contactor 1104) to join the terminal bus. It is determined safe (i.e. OKAY to Join) in paralleling example 1700, even though the bleed circuit was not able to bleed the terminal voltage (suggesting another battery pack was present). Battery pack 1100 is safe to join because the voltage of battery pack 1100 is within terminal latching voltage. For example, battery pack voltage 1710 is 57.2V and terminal voltage 1712 is 57.8V when BMS 1118 engages all contactors to join the terminal bus.

Figure 18:
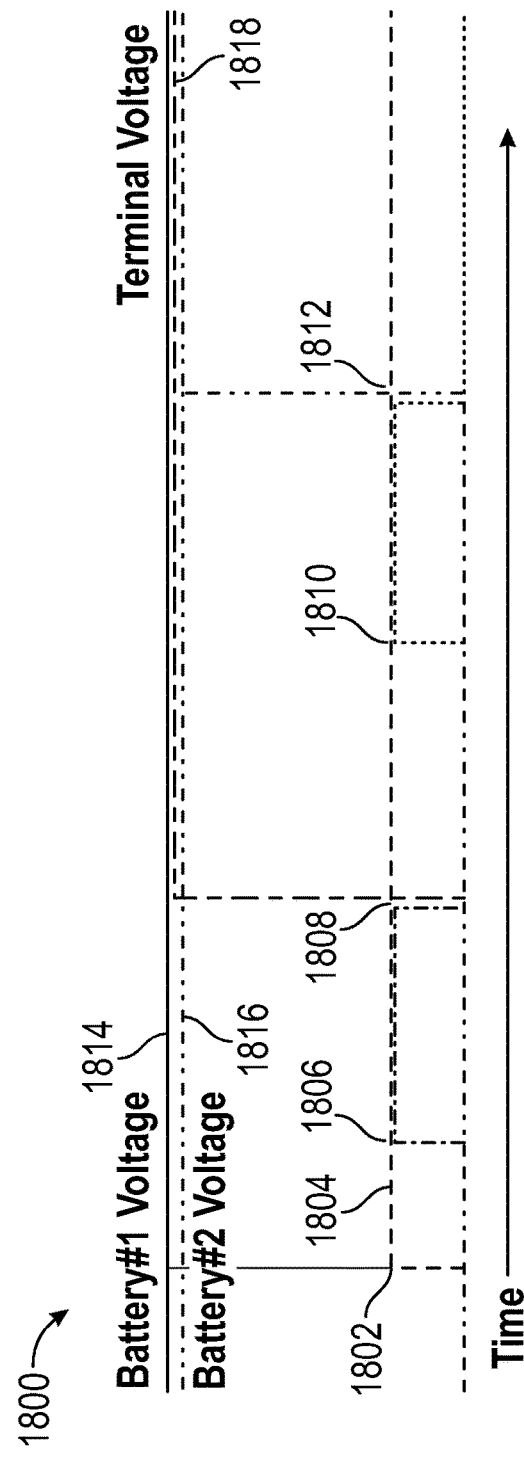
FIG. 18 is an example of the bleed circuit sequencing for the paralleling process of discharging one of the battery packs in the battery system of FIG. 1 with two or more batteries present and no CANbus communication.

Referring to FIG. 18, a paralleling example 1800 of the bleed circuit sequencing for the paralleling process of joining battery system 100 for discharge, is shown, according to an exemplary embodiment. Two battery packs are present, with no CANbus network communication, in paralleling example 1800. At time 1802, each BMS of both battery packs receives the discharge enable signal. At time 1804, each BMS waits a predetermined amount of time per the discharge sequencing table 1000 based on the battery pack voltage 1814 for the first battery pack and based on battery pack voltage 1816 for the second battery pack. Because the battery pack voltages 1814, 1816 differ, each battery pack has its own respective delay. After the delay is over for the first battery pack, at 1806 the first BMS engages the bleed circuit for the first battery pack to test for a terminal energy storage device. At time 1808, if the first BMS finds it safe, it engages all contactors (e.g., secondary contactor 1102 and primary contactor 1104) to join terminal.

In paralleling example 1800, it is determined safe (i.e. OKAY to Join) for the first battery pack to join because at time 1808 there was no terminal voltage present, meaning the battery pack was the first to join the terminal bus. At time 1810, the delay for the second battery pack is over and the second BMS engages the second battery pack's bleed circuit to test for terminal energy storage devices. Then at time 1812, if the second BMS determines it is safe to join, it engages all contactors of second battery pack to join terminal. It is found safe for the second battery pack to join as well because, despite not bleeding the terminal voltage, battery pack voltage 1816 is within terminal latching voltage. The terminal voltage 1818 will then adjust based upon the battery pack voltages 1814, 1816.

Figure 19:
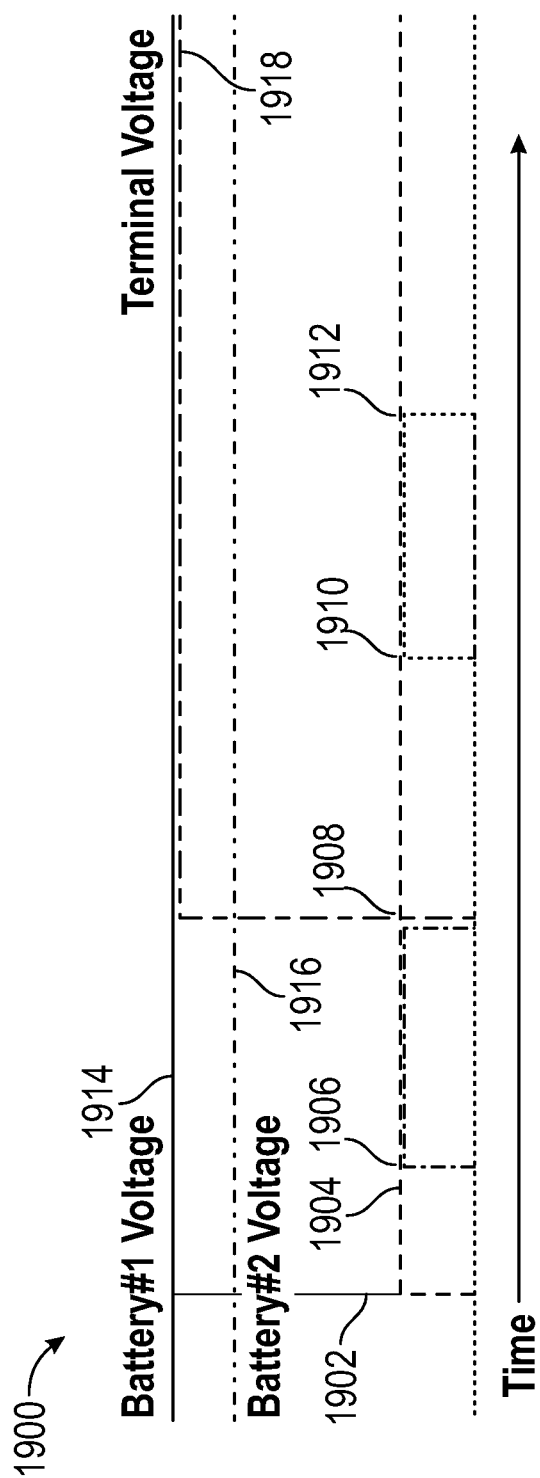
FIG. 19 is another example of the bleed circuit sequencing for the paralleling process of discharging one of the battery packs in the battery system of FIG. 1 with two or more batteries present and no CANbus communication.

Referring to FIG. 19, paralleling example 1900 of the bleed circuit sequencing for the paralleling process of two battery packs joining battery system 100 for discharge, is shown, according to an exemplary embodiment. Two battery packs are present, with no CANbus network communication, in paralleling example 1900, although in other embodiments there may be more than two battery packs. At time 1902, each BMS of the two battery packs receive the discharge enable signal. At time 1904, each BMS waits a predetermined amount of time per the discharge sequencing table 1000 based on battery pack voltage 1914 for the first battery pack and based on battery pack voltage 1916 for the second battery pack, each with their own respective delay. Once the delay is over for the first battery pack, at 1906 the first BMS engages the bleed circuit for the first battery pack to test for a terminal energy storage device. At time 1908, if the first BMS finds it safe, it engages all contactors (e.g., secondary contactor 1102 and primary contactor 1104) to join the terminal bus.

In paralleling example 1900, it is determined safe (i.e. OKAY to Join) for the first battery pack to join because at time 1908 there was no terminal voltage present, meaning the battery pack was the first to join the terminal bus. At time 1910, the delay for the second battery pack is over and the second BMS engages the second battery pack's bleed circuit to test for terminal energy storage devices. At time 1912, if the second BMS determines it is safe to join, it engages all contactors of second battery pack to join terminal. It is not found safe for the second battery pack to join because the second battery pack's bleed circuit could not bleed the terminal voltage and battery pack voltage 1916 was outside of terminal latching voltage. For example, the latching voltage is +/−1.00V and terminal voltage 1918 is at 57.5V and the battery pack voltage 1916 for the second battery pack is at 55.1V, meaning the second battery pack is not within latching range of the terminal. The second battery pack will continue to monitor (e.g., periodically or continuously) the voltage present on the terminal bus and will remain in standby mode until the voltage on the terminal bus falls to within the latching voltage range, where the second battery pack can then safely join the terminal bus.

Figure 21:
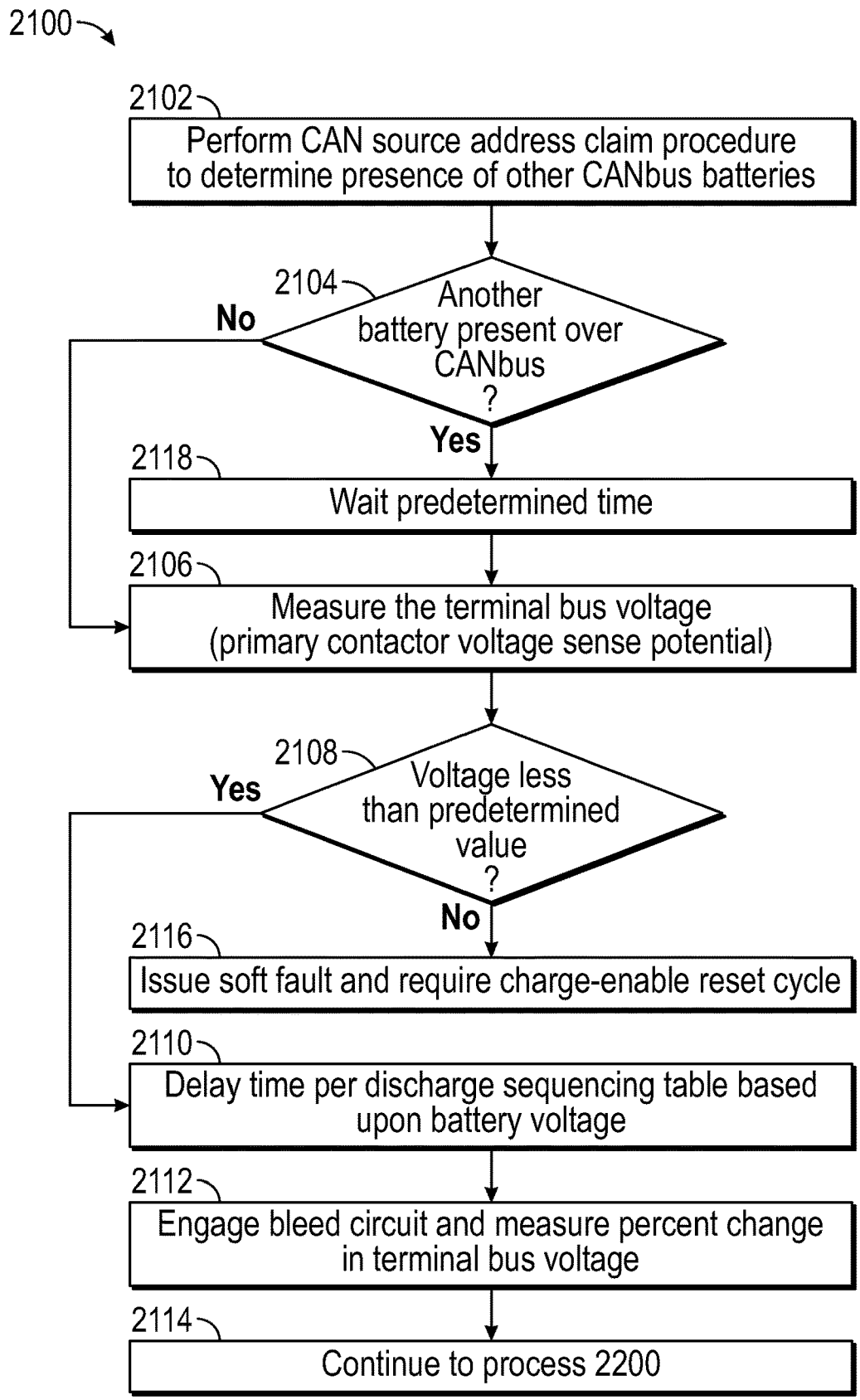
FIG. 21 is a flowchart of a process for determining ability of a battery pack to join in parallel with other battery packs of the battery system of FIG. 1 using the bleed circuit of FIG. 7 to charge, according to some embodiments.

Referring to FIG. 20, a charge sequencing table 2000 that can be used in the paralleling process for battery system 100, such as process 2100 described with reference to FIG. 21, is shown. The charge sequencing table 1000 may include a delay column 2002, a voltage range column 2004, and a sequence number column 2006. The voltage range column 2004 may be used in the process 2100, described with reference to FIG. 21, during step 2110 to find the delay in ms that corresponds to the measured terminal bus voltage value. The standard latching voltage is set to +/−1.00V and the incremental delay time for the next sequence is an added 250 ms for charge sequencing table 2000. In some embodiments, an active CANbus communication between BMS within each of the battery packs to the charger is required in order to charge any of the battery packs. In some examples, if a BMS does not have CANbus communication network that functions, the BMS may not permit the battery pack to charge.

Referring to FIG. 21, a flow diagram for an automated process 2100 for determining ability of a battery pack to join in parallel with other battery packs using a bleed circuit to charge is shown. The process 2100 begins by performing a CAN source address claim procedure to determine if other batteries are present on the CANbus network. Step 2102 may occur some predetermined time from the charge enable signal input, such as 1.5 seconds, which should be exactly the same amount of time regardless of whether another battery is found present. The presence or lack of any other CAN-enabled batteries is recorded and potentially acted on by the battery system (e.g., battery system 100). The process 2100 the proceeds to step 2104, where the battery pack determines if another battery is present over CANbus, which may be executed by a BMS such as BMS 714. If at step 2104 it is found that another battery is present, the process 2100 includes waiting a predetermined amount of time at step 2118 before proceeding to step 2106. For example, if another battery is present but not connected via the CAN, during the waiting period the other battery will time out and then permit the CAN-enabled batteries to begin charging.

Instead, if there is not another battery present over CANbus, process 2100 immediately proceeds to step 2106. At step 2106, the primary contactor (e.g., primary contactor 702) voltage sense potential, which is also the terminal bus voltage, is measured. The BMS 714 determines if the measured voltage is greater than or less than a predetermined value at step 2108. If in step 2108 it is found that the voltage is greater than a predetermined value, the BMS 714 issues a soft fault and may require a charge-enable reset cycle at step 2116. For example, if the predetermined value is 60V and the measured value is greater than 60V, the BMS 714 may issue a soft fault for High Terminal Bus Voltage.

However, if in step 2108 it is found that the voltage is less than the predetermined value, the process 2100 proceeds to step 2110, where the BMS 714 delays time per the charge sequencing table (e.g., the charge sequencing table 2000) based upon the measured battery voltage. After the delay in time from step 2110, the process 2100 continues by engaging the bleed circuit (e.g., bleed circuit 608) and measuring the percent change in terminal bus voltage at step 2112. Once the change in terminal bus voltage is measured, the process 2100 advances to step 2114, which begins the process 2200 shown in FIG. 22.

Figure 22:
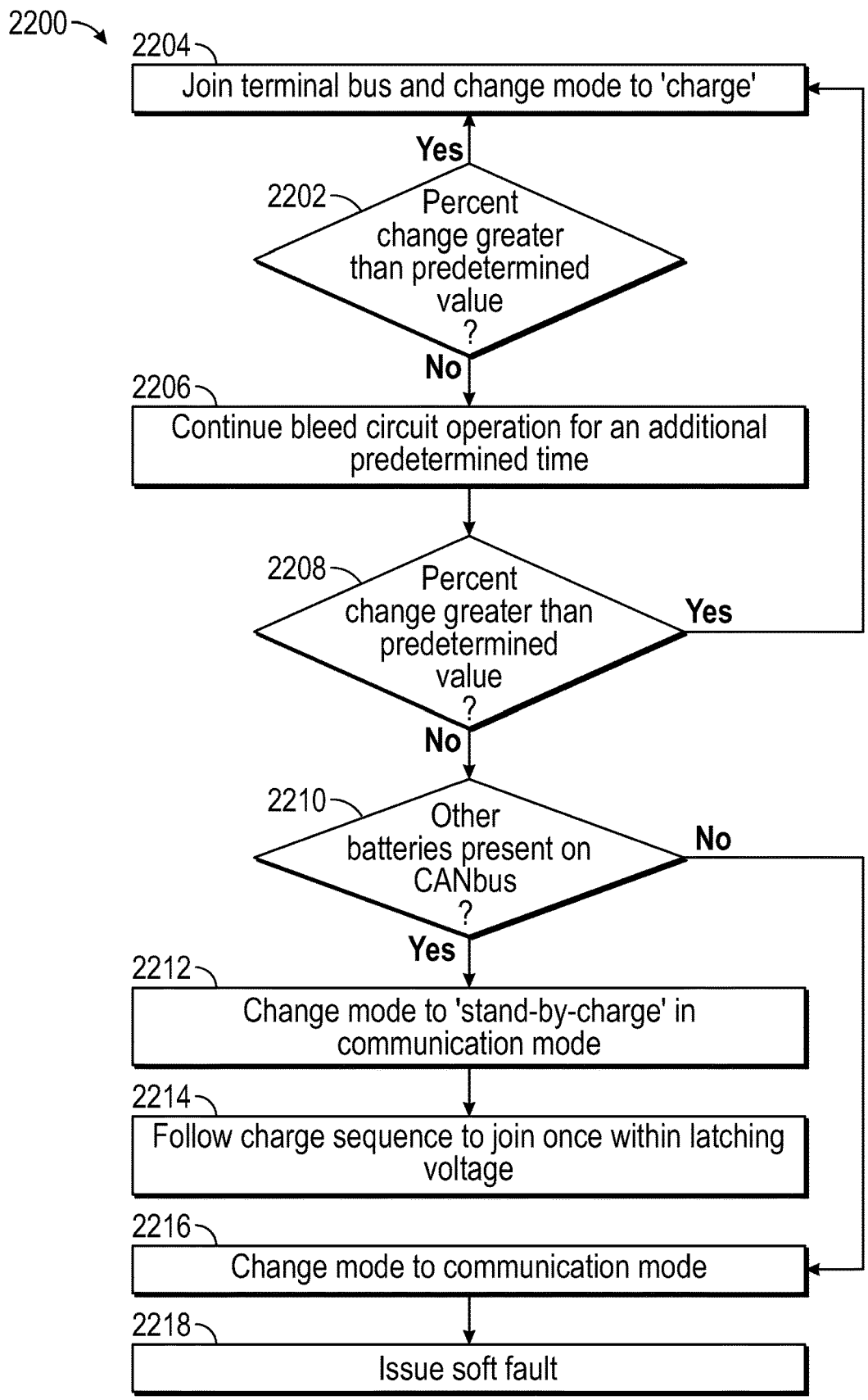
FIG. 22 is a flowchart of a process that continues from the process of FIG. 21, for determining an ability of a battery pack to join in parallel with other battery packs of the battery system of FIG. 1 using the bleed circuit of FIG. 7 to charge, according to some embodiments.

Referring to FIG. 22, a flow diagram for an automated process 2200 for determining the ability of a battery pack to join in parallel with other battery packs using the bleed circuit to charge is shown, according to an exemplary embodiment. As indicated above, the process 2200 begins at the conclusion of the process 2100. In some embodiments, the process 2200 begins at step 2202 with BMS 714 determining if the percent change in the terminal bus voltage after the voltage engages bleed circuit 608 in step 2112 from process 2100 is greater than a predetermined value. If it is found that the percent change is greater than the predetermined value, the process 2200 advances to step 2204, where the battery pack joins the terminal bus (by engaging the primary contactor) and changes its mode to 'charge.' For example, if after 100 ms the percent change is greater than 15 percent, primary contactor 702 engages and battery pack 600 joins positive terminal bus 122 and enters 'charge' mode. In some embodiments, a 10 second charger timeout countdown starts after 'charge' mode is entered and if no charger is present, a soft fault is issued and a charge enable cycle is required.

If it is found that the percent change is less than a predetermined value in step 2202, process 2200 advances to step 2206, where the BMS 714 continues bleed circuit operation for an additional predetermined time. In some embodiments, the predetermined value is 15 percent by the end of 100 ms and the additional predetermined time that bleed circuit operation continues is 50 ms, giving an overall amount of 150 ms. Once the additional predetermined time for bleed circuit operation ends, the BMS 714 may determine if the percent change is now greater than the predetermined value again, at step 2208. If after the additional time, the percent change is now large enough, the process 2200 advances to step 2204, where the battery pack joins the terminal bus and transitions to 'charge' mode. If the percent change is still not large enough after step 2208, the process 2200 advances to step 2210, where the BMS 714 continues determining if other batteries are present on CANbus. to the process 2200 includes changing modes to 'stand-by-discharge' in communication mode at step 2212 and then following a charge sequence to join the terminal bus once the battery pack is within the latching voltage of any other battery pack (i.e., 2 or more battery packs are present) on the CANbus at step 2214. If no other battery pack (i.e., only the battery pack attempting to join is present), the process 2200 includes changing modes to 'communication' mode at step 2216 and then issuing a soft fault (e.g., a soft fault to require charge enable cycle) at step 2218. In some embodiments, a restart of charge cycle is required to prevent the battery pack from attempting to charge blindly without CAN messaging to a charger.

Figure 23:
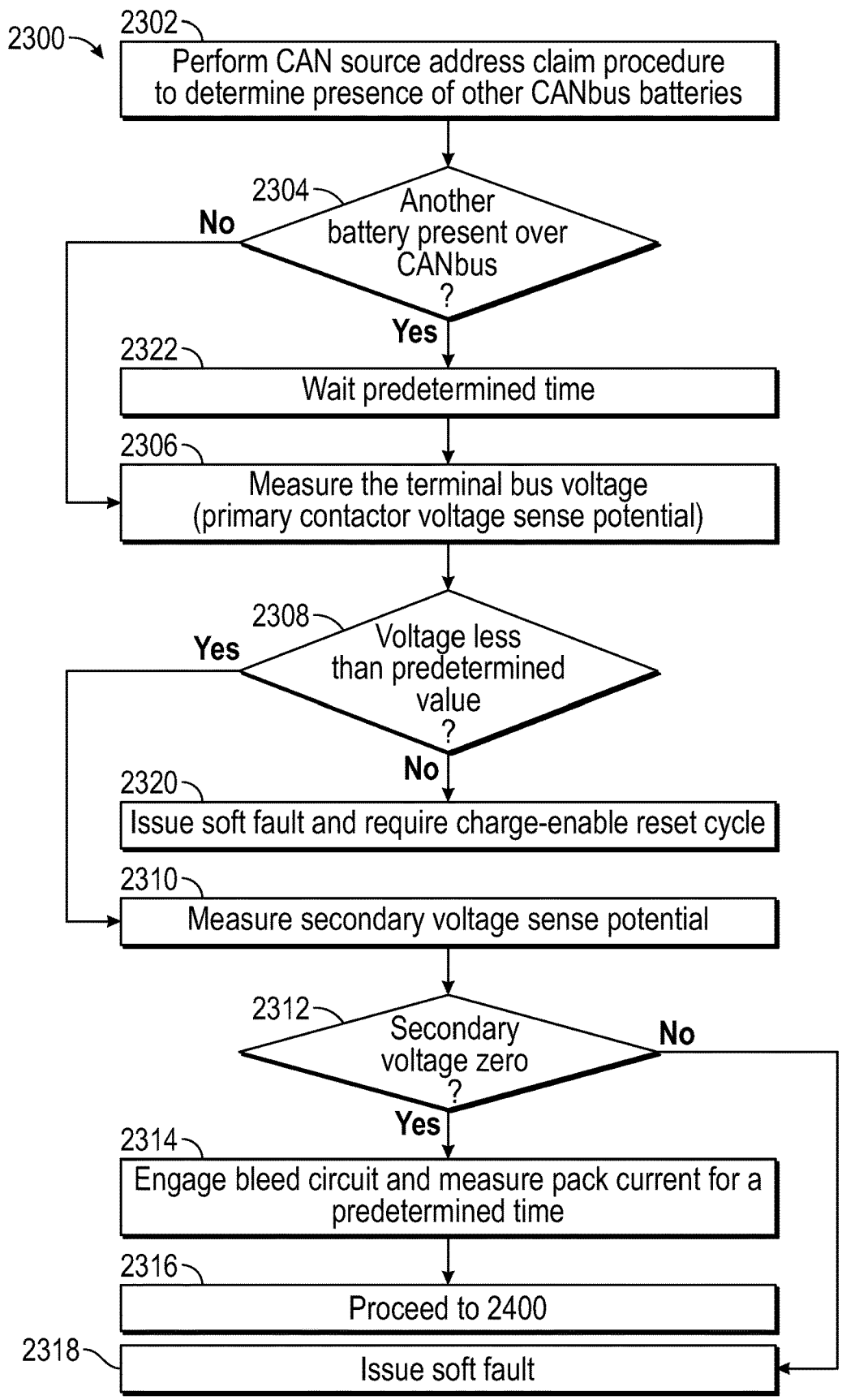
FIG. 23 is a flowchart of a process for determining ability of a battery pack to join in parallel with other battery packs of the battery system of FIG. 1 using the bleed circuit of FIG. 11 to charge, according to some embodiments.

Referring now to FIG. 23, an automated process 2300 for determining ability of a battery pack to join in parallel with other battery packs using a bleed circuit to charge is shown, according to an exemplary embodiment. Process 2300 begins at step 2302, where the battery pack performs a CAN source address claim procedure to determine if other batteries are present on the CANbus network. Step 2302 may occur at some predetermined time from the charge enable signal input (e.g., 1.5 seconds), which may be chosen to be identical to the amount of time regardless of whether any other battery is found present. The presence or lack of any other CAN-enabled batteries is recorded. The process 2300 then includes determining if another battery is present over CANbus at step 2304, which may be executed by a BMS such as BMS 1118 of the battery pack 600. If, at step 2304, the BMS 1118 finds that another battery is present, the process 2300 includes waiting a predetermined amount of time at step 2322 before proceeding to step 2306. For example, if another battery is present but not connected via the CAN, during the waiting period the other battery will time out and allow the CAN-enabled batteries to charge.

However, if there is not another battery present over CANbus, process 2300 immediately proceeds to step 2306. At step 2306, the process 2300 includes measuring primary contactor (e.g., primary contactor 1104) voltage sense potential (i.e., the terminal bus voltage). In some embodiments, BMS 1118 measures and then determines if the measured voltage is greater than or less than a predetermined value at step 2308. If in step 2308 it is found that the voltage is greater than a predetermined value, the process 2300 continues to step 2320, and issues a soft fault and may require a charge-enable reset cycle. For example, if the predetermined value is 60V and the measured value is greater than 60V, the process 2300 (e.g., by way of the BMS 1118) may issue a soft fault for High Terminal Bus Voltage and then may require a charge enable reset cycle for the battery pack. However, if in step 2308 is the BMS 1118 found that the voltage is less than the predetermined value, process 2300 continues to step 2310, and includes measuring the secondary (contactor) voltage sense potential. At step 2312, the process includes checking if the measured secondary voltage is zero, which may indicate that there is an issue with the primary contactor or a failure with the BMS 1118. If the secondary voltage is not 0V, a soft fault is issued at step 2318 that indicates that there may be a primary contactor or BMS failure. However, if the secondary voltage is 0V, process 2300 proceeds to step 2314, engaging the bleed circuit (e.g., bleed circuit 608) and measuring the current of the battery pack for a predetermined time. The process concludes at step 2316 and advances to the process 2400, shown in FIG. 24.

Figure 24:
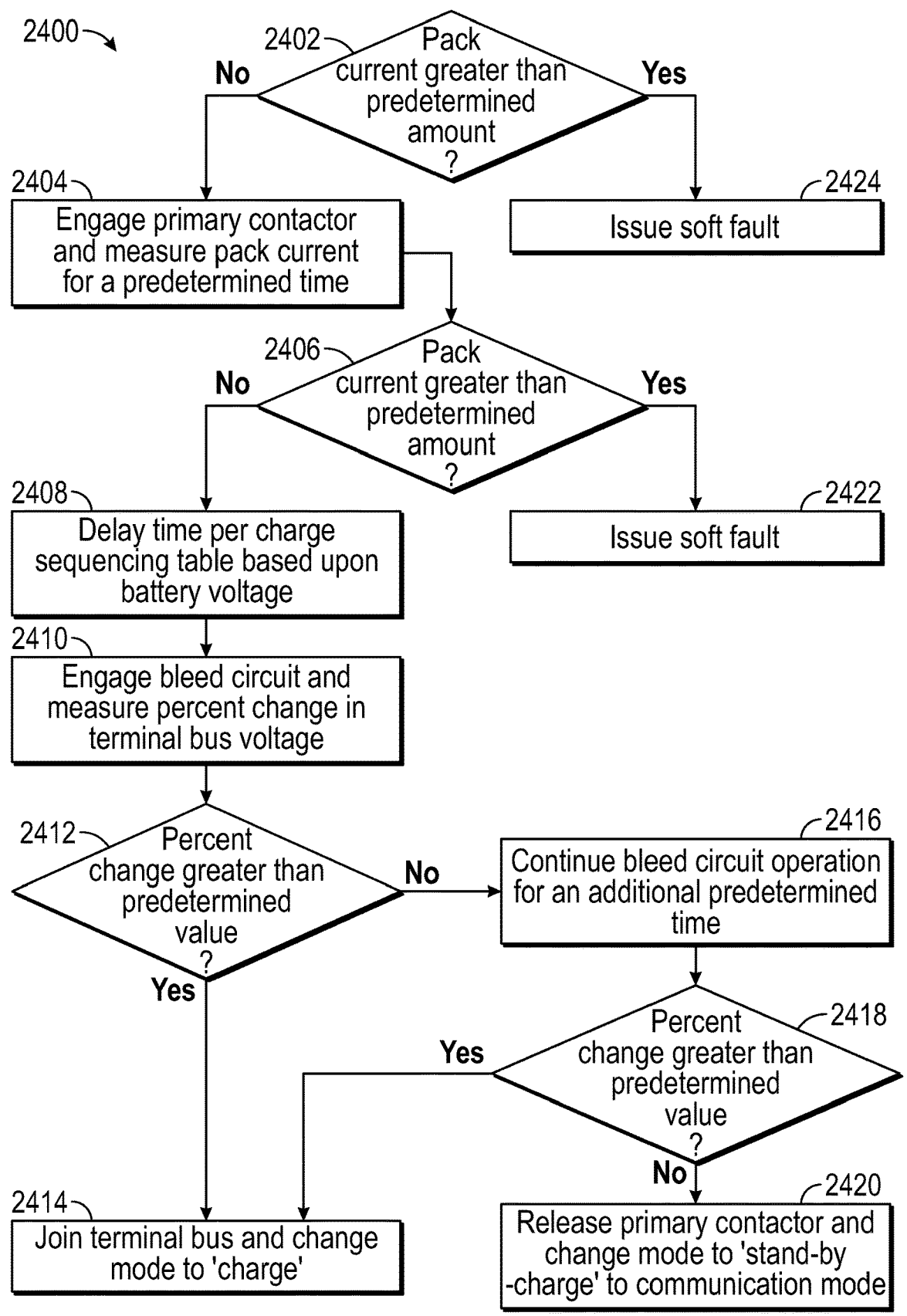
FIG. 24 is a flowchart of a process that continues from the process of FIG. 23, for determining ability of a battery pack to join in parallel with other battery packs of the battery system of FIG. 1 using the bleed circuit of FIG. 11 to charge, according to some embodiments.

Referring now to FIG. 24, an automated process 2400 for determining ability of a battery pack to join in parallel with other battery packs using a bleed circuit to charge is shown, according to an exemplary embodiment. Once the battery pack current is measured in step 2314 of process 2300, the BMS 1118 determines whether the current exceeds a predetermined amount at step 2402. For example, the battery current may be measured for 10.0 ms and checked to see if the absolute value of the current is larger than 1A of current. If the battery pack current exceeds the predetermined amount, the process 2400 proceeds to step 2424, where the BMS 1118 issues a soft fault that there may be a secondary contactor and/or secondary voltage sense failure. If the current measured in step 2314 is lower than the predetermined amount, the process 2400 advances to step 2404, where the BMS 1118 engages the primary contactor and measures the battery pack current again for a predetermined time.

At step 2406, the BMS 1118 may determine whether the current measured in step 2404 exceeds a predetermined amount. For example, the battery current may have a limit of 1A. Accordingly, the BMS 1118 needs to verify the absolute value of the current does not exceed more than 1A of current. The process 2400 includes issuing a soft fault that a failure of bleed circuit 608 may have occurred if the battery pack current exceeds the predetermined amount at step 2422. If the current measured in step 2406 is lower than the predetermined amount, the process 2400 advances to step 2408, and includes delaying time according to a charge sequencing table (e.g., charge sequencing table 2000) based upon the measured voltage. At step 2410, the process 2400 includes engaging the bleed circuit and measuring a percent change in terminal bus voltage (i.e., primary voltage sense potential).

At step 2412, the process 2400 includes determining if the change in percent of the terminal bus voltage after operating the bleed circuit 608 is greater than a predetermined value, which may be executed by BMS 1118. If the percent change is greater, the process 2400 advances to step 2414 by joining the terminal bus (by engaging the secondary contactor) and changing mode to 'charge.' In some embodiments, if the percent change is greater than 15 percent within 100 ms, secondary contactor 1102 engages and battery pack 600 joins positive terminal bus 122 and enters 'charge' mode.

Still referring to FIG. 24, if instead it is found that the percent change is lower than a predetermined value in step 2412, process 2400 advances to step 2416 and continues bleed circuit operation for an additional predetermined time. In some embodiments, the predetermined value is 15 percent within 100 ms and the additional predetermined time that bleed circuit operation continues for is 50 ms, with an overall value of time of 150 ms. At step 2418, process 2400 includes determining if the percent change is greater than the predetermined value after the additional time. If the percent change is large enough after the additional bleed circuit operation, process 2400 advances to step 2414 by joining the terminal bus (e.g., positive terminal bus 122) and changing mode to 'charge.' If instead the percent change is too low still after the added time of operating the bleed circuit, the process 2400 includes changing the mode of the battery to 'stand-by-charge' in communication mode at step 2420.

In some embodiments, the goal of the paralleling system in charge mode is to re-balance all the battery packs in the parallel configuration (e.g., battery pack 402, battery pack 404, battery pack 406, and battery pack 408 as described with reference to FIG. 4). Overall, during charge mode for parallel joining, a battery (e.g., battery pack 402) may start its positive terminal bus sequence with inverse timing based on the individual voltage of battery pack 402. After checking if a terminal bus voltage is present, a battery pack will join if the terminal bus voltage is not present and will attempt to bleed the circuit if the terminal bus voltage is present, according to an exemplary embodiment. Then, the battery pack may join the parallel system if the circuit does bleed, and if the circuit does not bleed down, an alarm may be created. All the batteries in charge mode may command Constant Current (CC) until any one of the batteries commands Constant Voltage (CV). Once one battery commands CV, then all the other batteries may go into CV mode as well. In some embodiments, the CV command comes from the weakest battery in the parallel battery system. This may likely occur because batteries can negotiate to pause or terminate charging, or resume later to 'top-charge' batteries that perform better in the system. In the battery system, any one of the batteries may command the charger. Also, an initial low charge rate to determine how many chargers are present on the bus may be requested. Two measurements or more can be taken and then an update charge rate can be used with a multiplier. There may be a string of commands sent by the digital communications protocol to assess accurately how many chargers are connected to the parallel system.

The various methods and systems described herein may allow battery systems in various types of equipment (e.g., outdoor power equipment, indoor power equipment, portable jobsite equipment, military vehicle applications, etc.) to utilize parallel battery packs safely and prevent damage to the health of individual battery packs when they attempt to join a system in a parallel configuration. The timed entry of engaging the bleed circuit and joining a parallel configuration of other battery packs (as described in processes 1200, 1300, 2100, 2200, etc.) advantageously may allow a battery pack to avoid an inrush of current that is damaging to the function of the battery pack. The delays from a sequencing table may become more helpful as a battery pack ages as well. Additionally, having dual axis contactors prevents a physical shock in a direction (e.g., axial to contactor) from causing both the primary and the secondary contactor from engaging from the same shock load. The charging ability of methods described with references to FIG. 21 through FIG. 24 may help re-balance all the battery packs in the parallel configurations that have a unique state of charge. A parallel configuration with unbalanced battery packs can lead to destructive circumstances, such as 2000 Amps instantaneously from one battery pack to another, when there is also low internal resistance in the battery packs. By preventing damaging, instantaneous current in battery packs of the system, the battery life of the battery system in different types of equipment may be extended.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

It should be understood that while the use of words such as desirable or suitable utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," or "at least one" are used there is no intention to limit the claim to only one item unless specifically stated to the contrary in the claim.

It should be noted that certain passages of this disclosure can reference terms such as "first" and "second" in connection with side and end, etc., for purposes of identifying or differentiating one from another or from others. These terms are not intended to merely relate entities (e.g., a first side and a second side) temporally or according to a sequence, although in some cases, these entities can include such a relationship. Nor do these terms limit the number of possible entities (e.g., sides or ends) that can operate within a system or environment.

The terms "coupled" and "connected" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

What is claimed is:

1. A battery pack comprising:
    a housing having a positive terminal and a negative terminal;
    a plurality of battery cells located within the housing and selectively coupled to the positive terminal and coupled to the negative terminal;
    a battery management system located within the housing and configured to operate a first switch within the housing to selectively couple the plurality of battery cells and the positive terminal; and
    a bleed circuit electrically coupled between the positive terminal and the negative terminal, the bleed circuit including a resistor and a second switch to selectively couple the positive terminal to the negative terminal;
    wherein the battery management system is configured to:

open the first switch and close the second switch and measure a voltage drop across the resistor to detect a presence of a voltage source connected to the positive terminal; and determine, based on the measured voltage drop, whether the voltage source is capacitive.

2. The battery pack of claim 1, wherein the battery management system measures the voltage drop across the resistor by comparing a first measured voltage to a second measured voltage, the second measured voltage being measured at a time interval after the first measured voltage.

3. The battery pack of claim 2, wherein the battery management system determines whether the voltage source connected to the positive terminal is capacitive by comparing the first measured voltage to the second measured voltage and determining if a difference between the first measured voltage and the second measured voltage exceeds a threshold value.

4. The battery pack of claim 3, wherein the battery management system determines that the voltage source is capacitive if the difference between the first measured voltage and the second measured voltage exceeds the threshold value.

5. The battery pack of claim 3, wherein the battery management system determines that the voltage source is a battery if the difference between the first measured voltage and the second measured voltage does not exceed the threshold value.

6. The battery pack of claim 3, wherein the battery management system is configured to open the second switch and close the first switch in response to determining that the difference between the first measured voltage and the second measured voltage exceeds the threshold value to couple the battery cells to the positive terminal and decouple the bleed circuit from the positive terminal.

7. The battery pack of claim 1, further comprising a third switch within the housing and in communication with the battery management system, the third switch being positioned in series with the first switch and the positive terminal and positioned in series with the bleed circuit, wherein when the third switch is open, the bleed circuit is decoupled from the positive terminal and wherein when the third switch is closed, at least a portion of the bleed circuit is coupled with the positive terminal.

8. The battery pack of claim 7, wherein the battery management system senses the voltage source connected to the positive terminal by comparing voltage signals upstream of the third switch and downstream of the third switch when the third switch is open and the second switch is closed.

9. The battery pack of claim 7, wherein after the battery management system detects the voltage source is connected to the positive terminal, the battery management system is configured to close the third switch to electrically couple the bleed circuit to the positive terminal to detect a type of the voltage source connected to the positive terminal, the type of the voltage source being determined by comparing measured voltage drop across the resistor over a time period and comparing the measured voltage drop to a threshold value.

10. The battery pack of claim 9, wherein the battery management system is configured to close the first switch, open the second switch, and close the third switch to couple the battery cells to the positive terminal upon detecting that the voltage source is capacitive.

11. The battery pack of claim 9, wherein the battery management system is configured to close the first switch, open the second switch, and close the third switch to couple the battery cells to the positive terminal upon detecting that the voltage source is a battery having a discharge voltage within a predetermined range.

12. The battery pack of claim 9, wherein the battery management system is configured to maintain the first switch open upon detecting that the voltage source is a battery having a discharge voltage outside a predetermined range.

13. The battery pack of claim 1, wherein the battery management system is coupled to a controller area network bus (CANbus) link, the CANbus link configured to communicate a state of charge of the battery pack with additional battery packs.

14. A battery pack comprising:
a housing including a positive terminal and a negative terminal;
a plurality of battery cells received within the housing and selectively coupled to the positive terminal and coupled to the negative terminal;
a battery management system received within the housing and configured to operate a primary contactor switch and a secondary contactor switch to selectively couple the plurality of battery cells and the positive terminal; and
a bleed circuit extending between the positive terminal and the negative terminal, the bleed circuit including a resistor and a bleed switch to selectively couple the positive terminal to the negative terminal;
wherein the battery management system is configured to determine a presence of a voltage source on the positive terminal when the secondary contactor switch is in an open position;
wherein the battery management system is configured to determine a type of the voltage source on the positive terminal when the secondary contactor switch is in a closed position and the bleed switch is in a closed position.

15. The battery pack of claim 14, wherein the battery management system determines the type of the voltage source on the positive terminal when the primary contactor switch is in an open position such that the battery cells are decoupled from the positive terminal.

16. The battery pack of claim 14, wherein the battery management system is configured to open the bleed switch, close the primary contactor switch, and close the secondary contactor switch upon determining that no voltage source is present on the positive terminal to couple the battery cells to the positive terminal.

17. The battery pack of claim 14, wherein the battery management system is configured to close the primary contactor switch and close the secondary contactor switch to couple the battery cells to the positive terminal when the voltage source is either capacitive or battery-based.

18. The battery pack of claim 17, wherein the battery management system is configured to maintain at least one of the primary contactor switch and the secondary contactor switch in the open position to prevent the battery cells from being coupled to the positive terminal if a battery-based voltage source is detected on the positive terminal outside of a predetermined voltage range.

19. A battery system comprising:
a first battery pack coupled to a terminal bus and providing a voltage to the terminal bus; and
a second battery pack coupled to the terminal bus, the second battery pack comprising:
a positive terminal and a negative terminal,
a bleed circuit selectively coupled to the negative terminal, one or more contactors,
one or more battery cells selectively coupled to the positive terminal and selectively coupled to the terminal bus based upon a position of the one or more contactors, and
a battery management system structured to:
measure the voltage of the terminal bus coupled to the bleed circuit, the voltage corresponding to an output voltage of the first battery pack;
determine if the voltage of the terminal bus is less than a predetermined value;
in response to determining the voltage is less than the predetermined value, engage the bleed circuit with the terminal bus to attempt to bleed down the voltage of the terminal bus;
in response to determining that the voltage of the terminal bus is not bleeding down by a predetermined threshold amount, determine if the voltage of the terminal bus is within a latching voltage range; and
couple the battery cells to the terminal bus by closing the one or more contactors in response to determining that the voltage of the terminal bus is within the latching voltage range.

20. The battery system of claim 19, wherein the battery management system is structured to change a mode of the second battery pack to communicate to a Digital Communication Protocol to couple to the second battery pack to the first battery pack.

* * * * *